Feb. 17, 1959   E. F. LINHORST   2,873,475
AUTOMATIC RUBBER MOLDING MACHINE
Filed Oct. 25, 1955   9 Sheets-Sheet 1
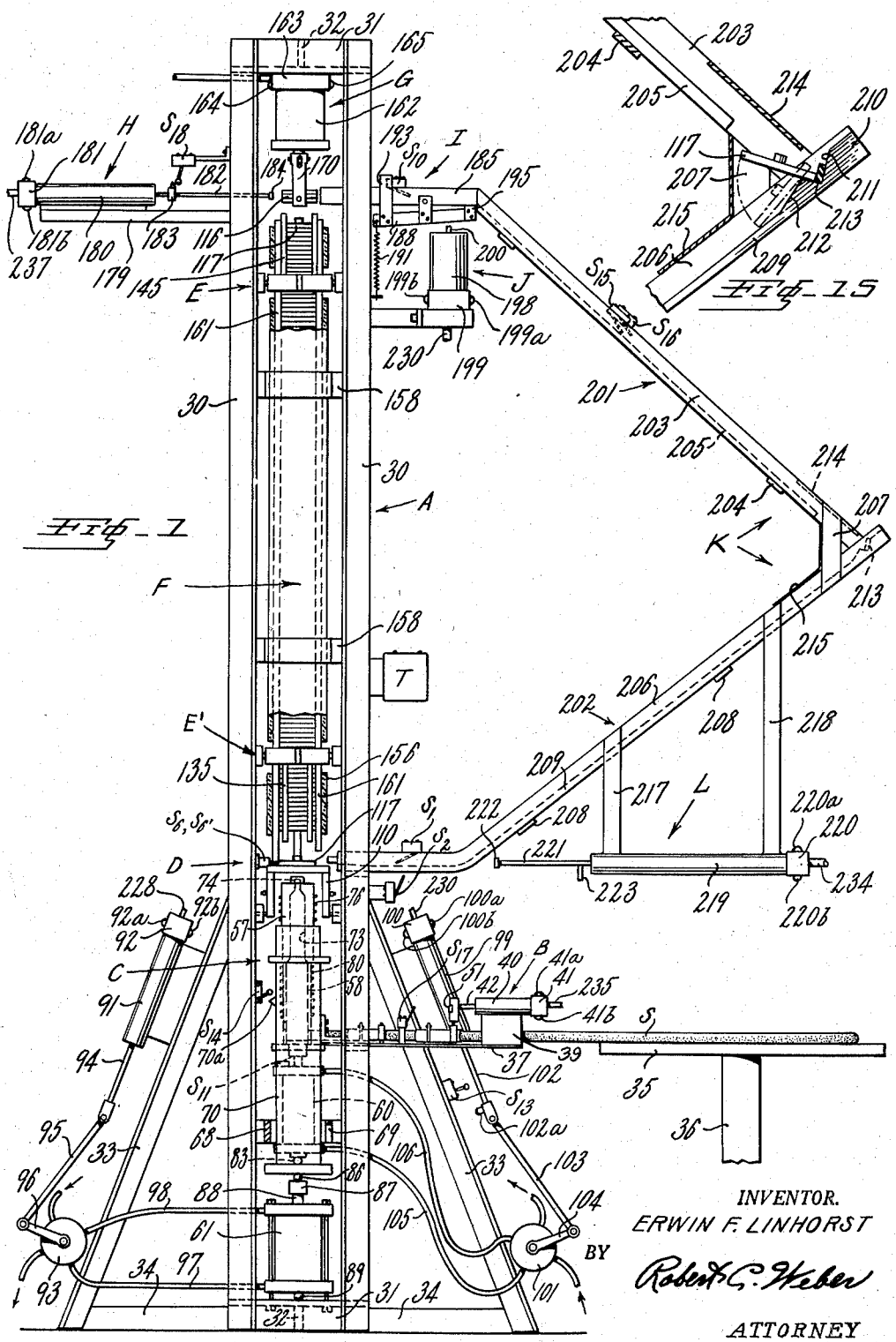
INVENTOR.
ERWIN F. LINHORST
BY
Robert C. Weber
ATTORNEY

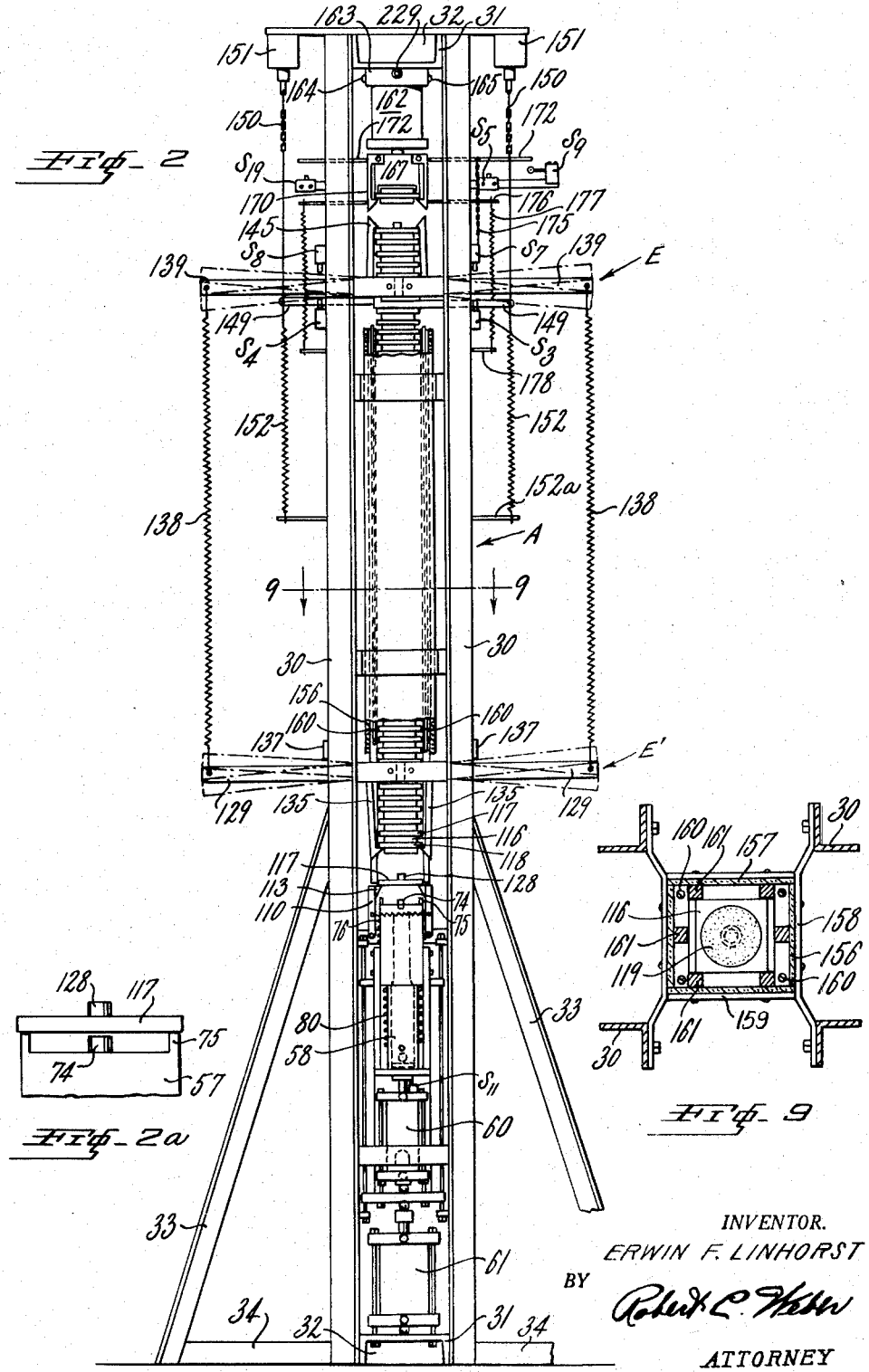

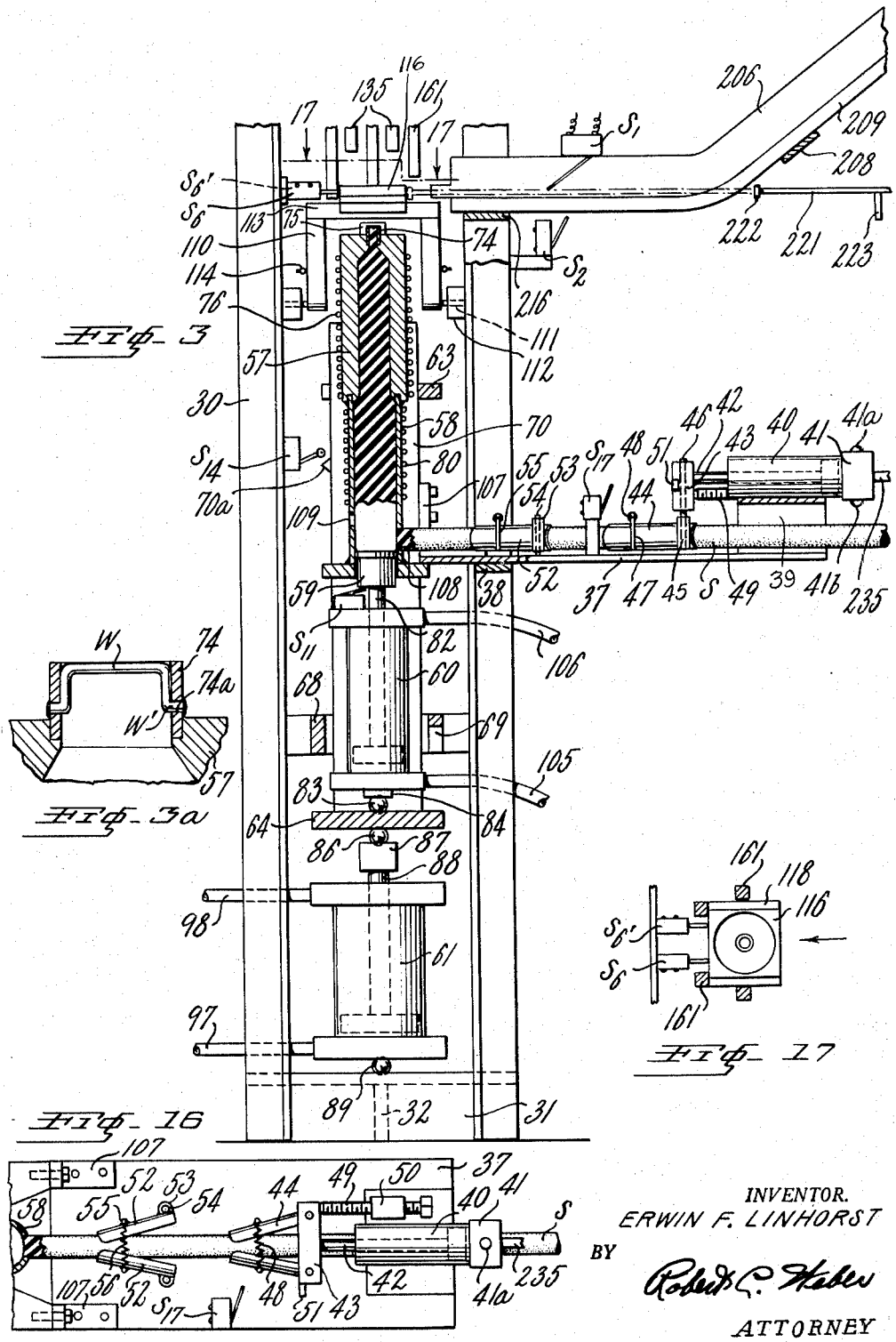

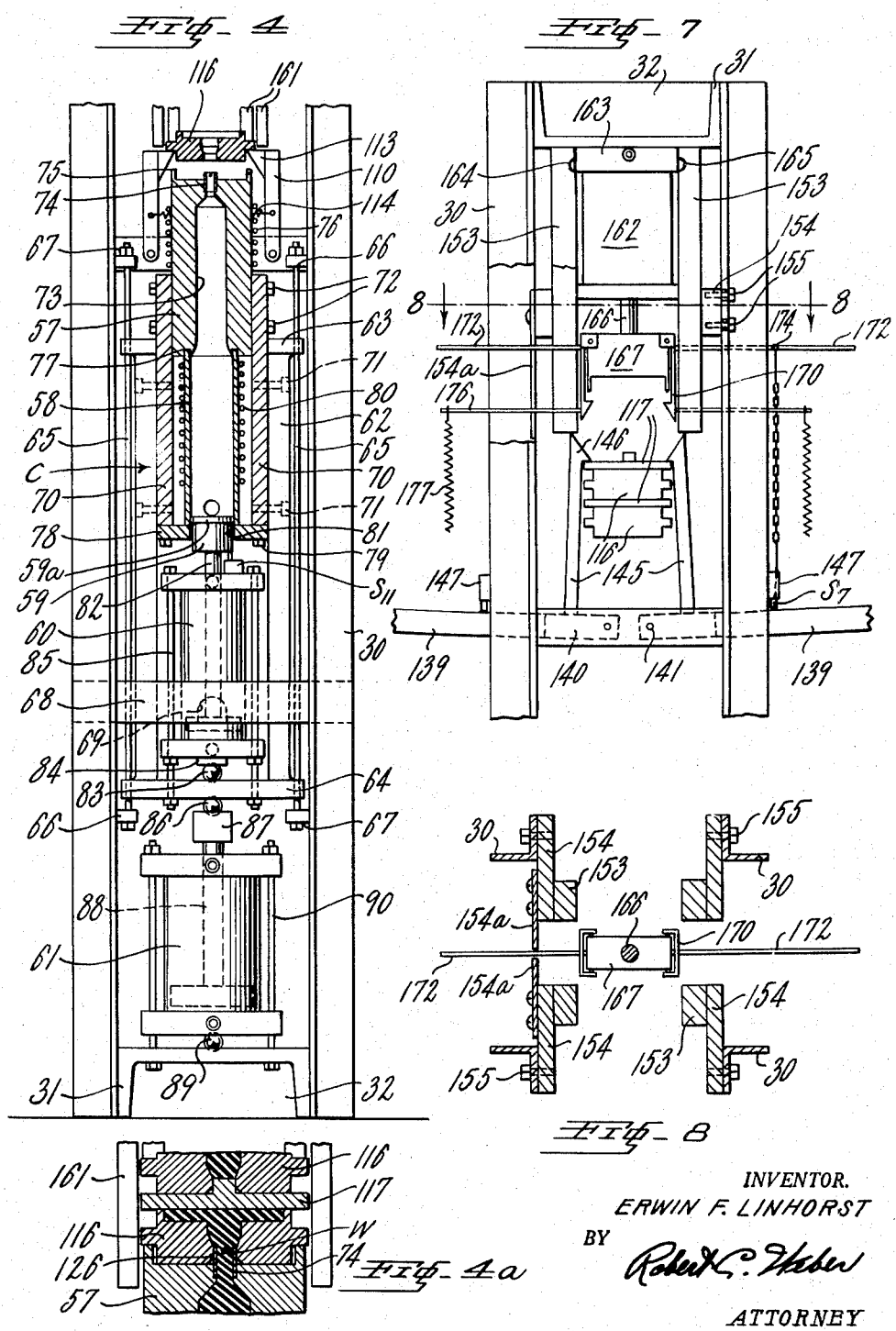

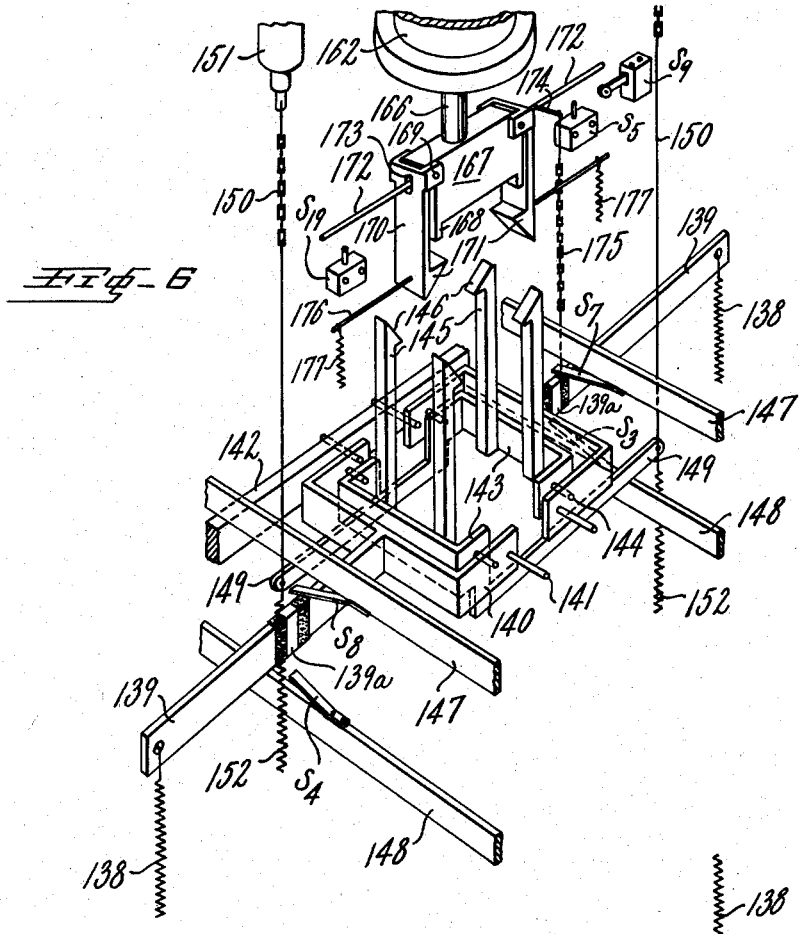

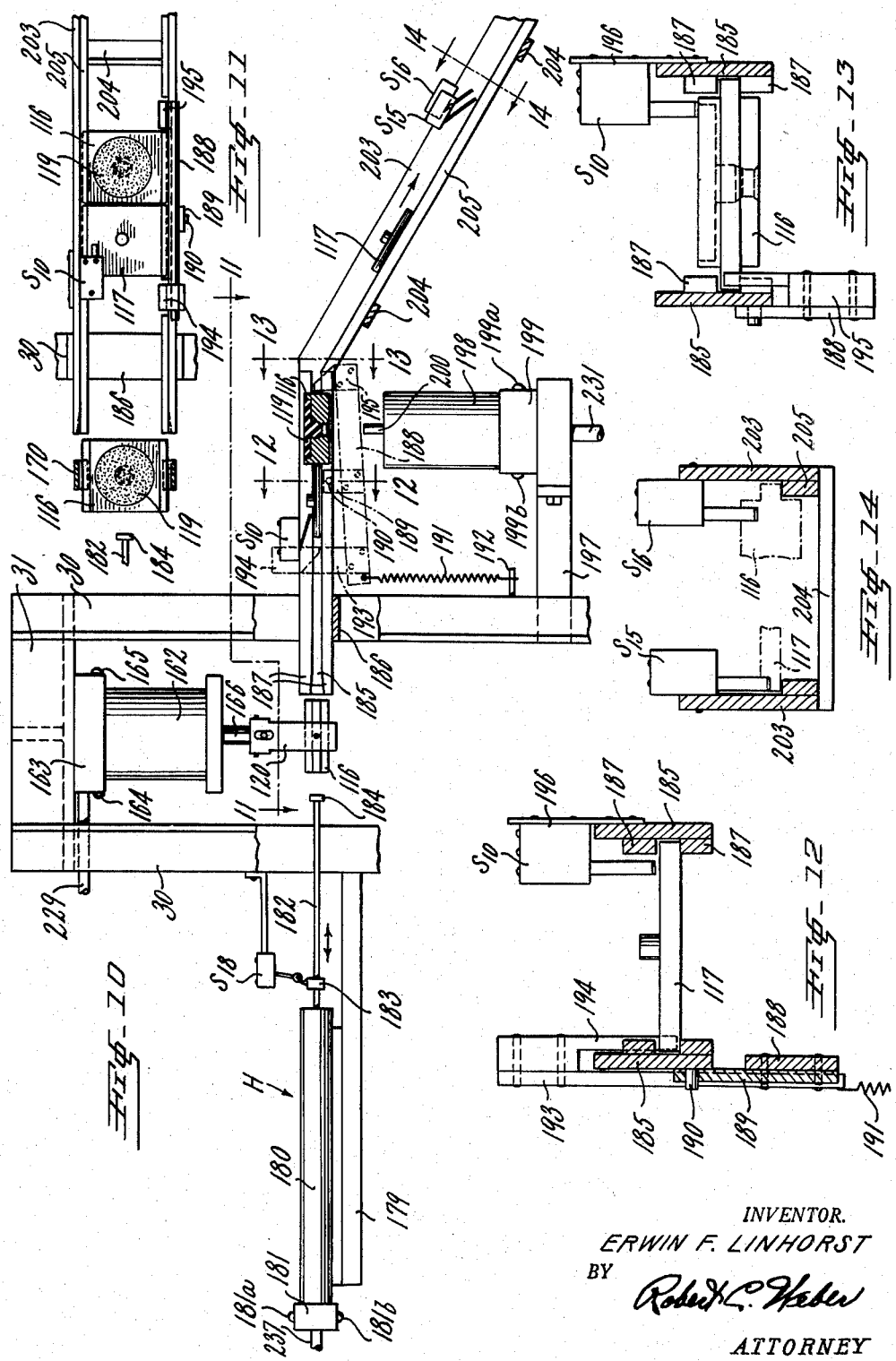

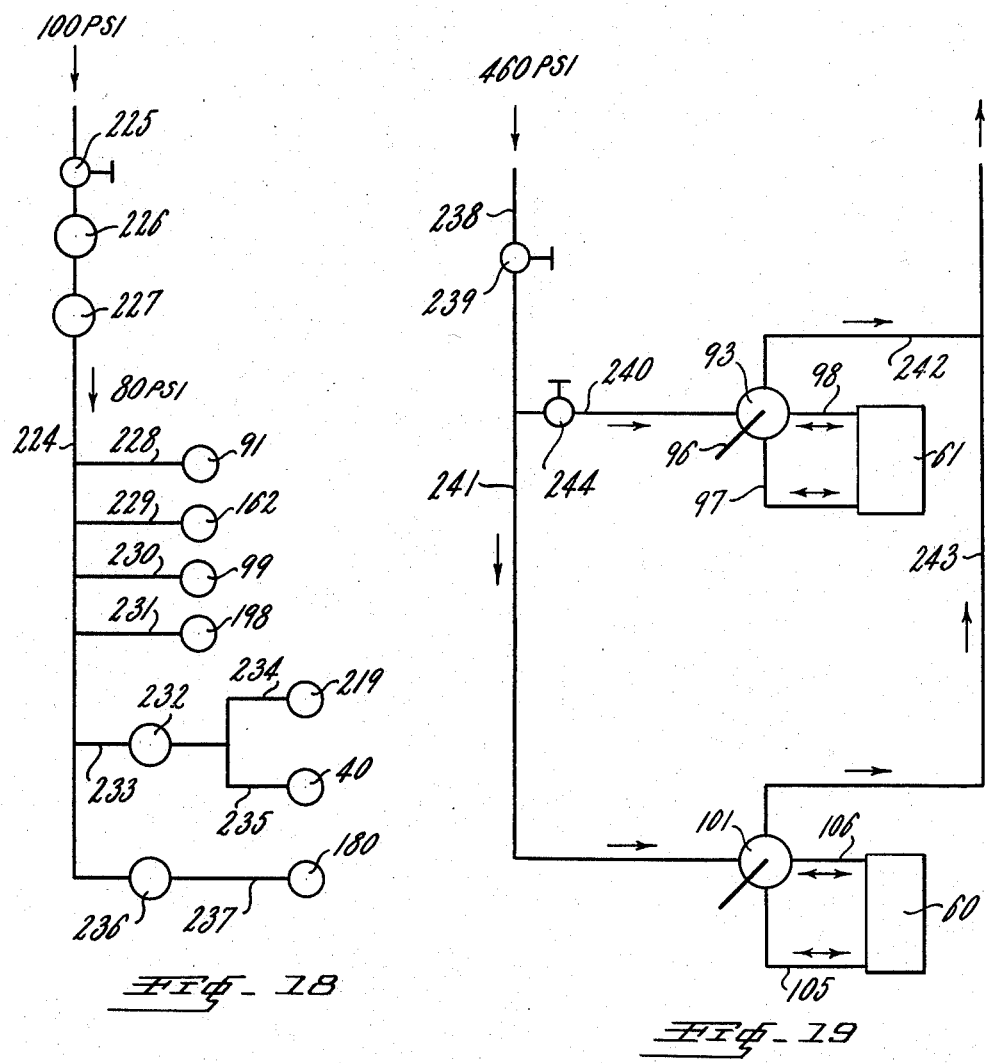

Feb. 17, 1959 E. F. LINHORST 2,873,475
AUTOMATIC RUBBER MOLDING MACHINE
Filed Oct. 25, 1955 9 Sheets-Sheet 8

INVENTOR.
ERWIN F. LINHORST
BY
ATTORNEY

Feb. 17, 1959
E. F. LINHORST
2,873,475
AUTOMATIC RUBBER MOLDING MACHINE
Filed Oct. 25, 1955
9 Sheets-Sheet 9
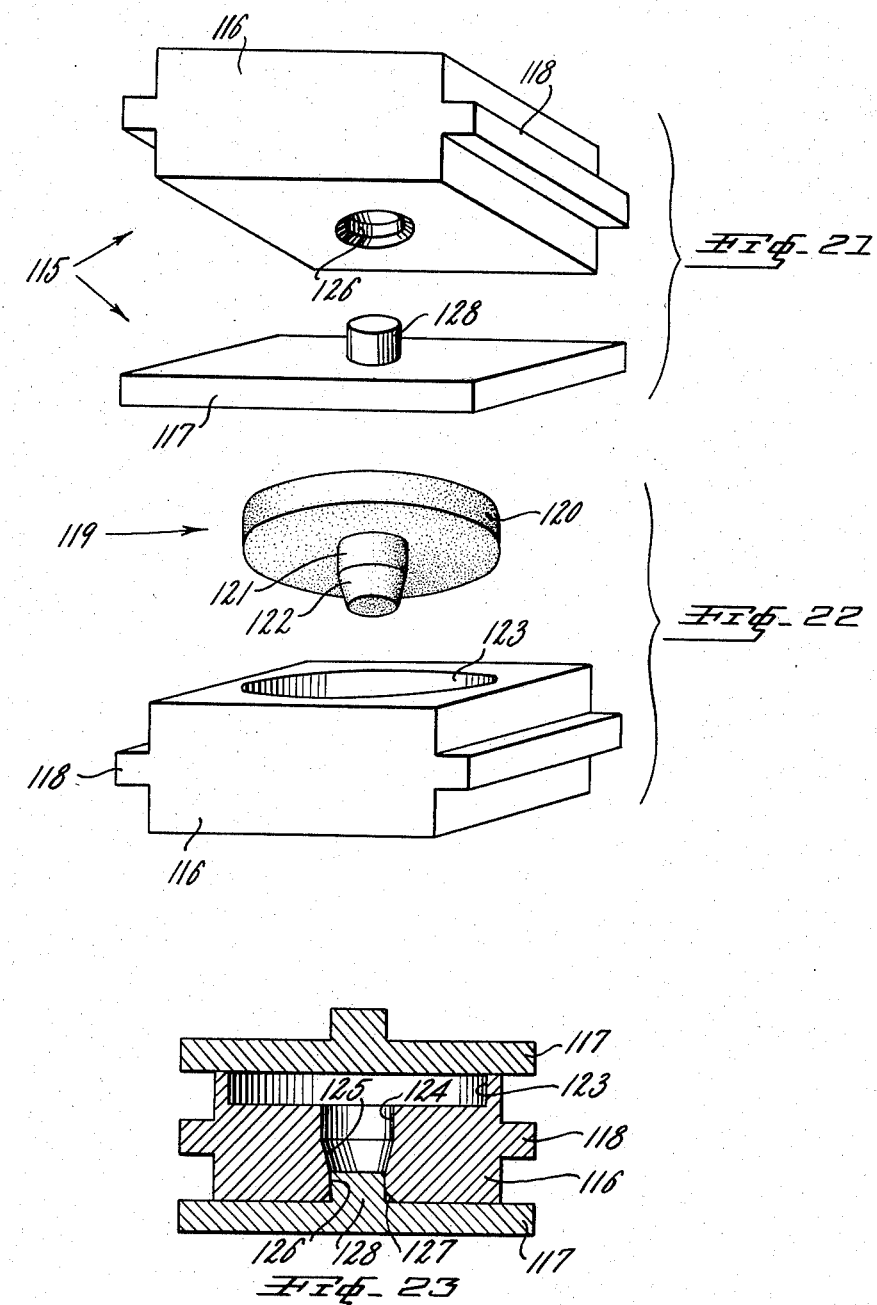
INVENTOR.
ERWIN F. LINHORST
BY
ATTORNEY

United States Patent Office

2,873,475
Patented Feb. 17, 1959

2,873,475

AUTOMATIC RUBBER MOLDING MACHINE

Erwin F. Linhorst, Fort Wayne, Ind., assignor to United States Rubber Company, New York, N. Y., a corporation of New Jersey Application October 25, 1955, Serial No. 542,659

35 Claims. (Cl. 18—4)

This invention relates to improvements in machines for molding rubber and like articles, and more particularly to a machine comprising a plurality of electrically controlled mechanisms which continuously and automatically, feed the moldable material, position the unassembled mold parts, properly fill the mold cavities, assemble the mold parts, support the assembled molds in stacked relationship, progressively cure the moldable material, re-position the assembled molds, disassemble the molds, eject the completely molded articles therefrom, and re-position the unassembled mold parts for subsequent molding operations.

There have been a number of improvements made in devices for molding rubber and like articles wherein one or more of the required operations have been made automatic. However, a considerable amount of routine human labor is still required with the apparatus presently in use. For example, it is common in present practice to cure a plurality of rubber and like parts in a multicavity steam press, which is usually loaded and operated by hand. Even though the press may be provided with mechanisms for automatically separating the mold plates and ejecting the cured articles therefrom, a considerable amount of flash is usually formed. Although machines may be provided for such flash removal, human labor in addition to that required for the operation of the press, is needed for such finishing operations. Moreover, the capacities of such steam presses are limited by the available platen area, so that for quantity production a large number of presses are necessary. Accordingly, more press operators are needed, a considerable amount of floor space is required, and manufacturing costs are relatively high.

Therefore, an object of this invention is to provide a molding machine which is capable of fully automatic operation in order to eliminate routine human labor from rubber molding operations.

Another object of this invention is to provide a molding machine which is so constructed that a large number of rubber and like articles may be continuously and automatically molded with no waste of raw rubber, little or no cured waste such as flash, and the minimum of maintenance and service labor.

A further object of the invention is to provide a molding machine which is so constructed that production of the molded articles may be considerably increased by elimination of the usual pressman labor, a substantial reduction in the amount of floor space required, and a corresponding saving in manufacturing costs.

Additional objects and advantages of this invention will become apparent upon consideration of the following specification and claims when read in conjunction with the accompanying drawings wherein:

Fig. 1 is an elevational side view of an automatic rubber molding machine embodying the principles of this invention;

Fig. 2 is a front elevational view of the machine shown in Fig. 1;

Fig. 2a is an enlarged fragmentary view of a portion of Fig. 2, illustrating the relationship between the injection head and a mold plug plate;

Fig. 3 is a side elevational view partially in section, and illustrating the detailed structure of the material feeding and injection mechanisms, as well as the mechanism for guiding and positioning the mold plates over the injection mechanism;

Fig. 3a is an enlarged fragmentary section of a portion of Fig. 3 illustrating the details of the injection nozzle;

Fig. 4 is a front elevational view similar to Fig. 3;

Fig. 4a is an enlarged fragmentary view of a portion of Fig. 4, illustrating the relationship between the injection head and a mold cavity plate;

Fig. 5 is a perspective view of the lower pawl mechanism which supports the assembled molds in stacked relationship;

Fig. 6 is a perspective view of the upper pawl mechanism as well as the mechanism for compressing the mold column and disassembling the molds;

Fig. 7 is an enlarged front elevational view of the upper portion of the molding machine shown in Fig. 2, illustrating the stops for the upper pawl mechanism and the guide plates for the piston foot of the mold disassembly mechanism;

Fig. 8 is a horizontal sectional view taken on line 8—8 of Fig. 7;

Fig. 9 is a horizontal sectional view taken on line 9—9 of Fig. 2, illustrating the cross-sectional structure of the guide rods for the mold column and the heating unit for curing the material in the molds;

Fig. 10 is an enlarged side elevational view of the upper portion of the machine, illustrating the construction of the mechanism for removing the mold plates from the mold disassembly mechanism, the release catch-lever mechanism, the ejection mechanism and the upper portion of the slide;

Fig. 11 is a horizontal sectional view taken on line 11—11 of Fig. 10;

Fig. 12 is a vertical sectional view taken on line 12—12 of Fig. 10;

Fig. 13 is a vertical sectional view taken on line 13—13 of Fig. 10;

Fig. 14 is a vertical sectional view taken on line 14—14 of Fig. 10;

Fig. 15 is an enlarged fragmentary view, partially in section, of the mold plate stop mechanism in the slide illustrated in Fig. 2;

Fig. 16 is a fragmentary top plan view of the material feeding mechanism illustrated in Fig. 3;

Fig. 17 is a horizontal sectional view taken on line 17—17 of Fig. 3, illustrating the cross-sectional structure of part of the mechanisms for positioning and guiding the mold plate over the injection mechanism;

Fig. 18 is a schematic view of the pneumatic circuit employed in operating the machine;

Fig. 19 is a schematic view of the hydraulic circuit used in the operation of the machine;

Fig. 21 is an exploded perspective view of a multi-part mold suitable for use in the machine;

Fig. 2 is an exploded perspective view of a typical part which may be molded in the machine and the cavity plate in which it is molded, and Fig. 23 is a sectional view illustrating how a cavity plate is interposed between two successive plug plates in the mold column to form the article being molded.

Figure 20:
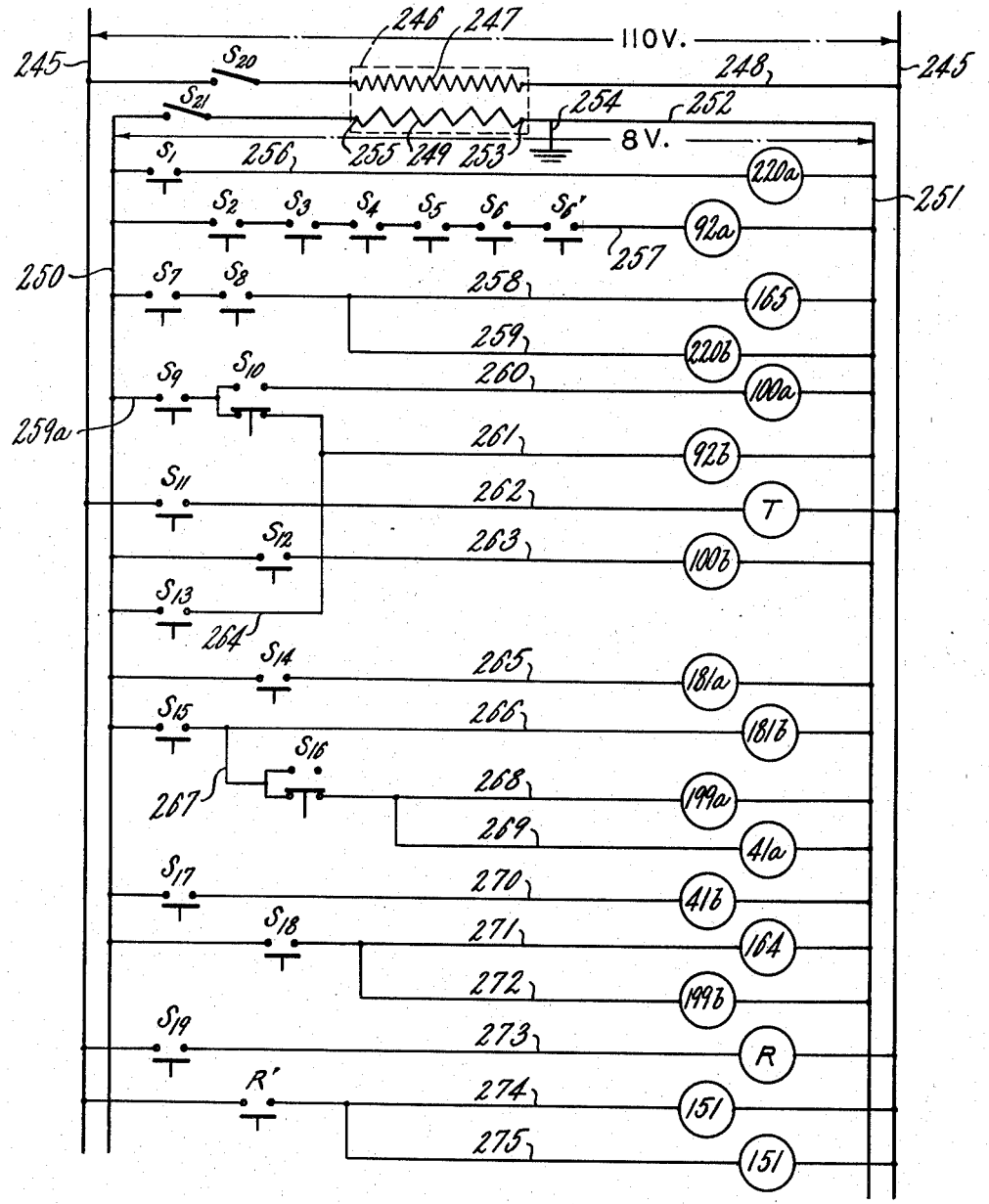
Fig. 20 is a schematic view of the circuits comprising the electrical system for controlling the operation of the machine.

Referring to Fig. 1, the machine comprises generally a supporting frame A, on which are mounted the stock feed mechanism B, the injection unit C and its actuating mechanisms, the mold plate landing device D, the upper and lower mold column supports E, E', the mold column heating and guiding unit F, the mold disassembly mechanism G, the mold-repositioning device H, the mold release-catch lever mechanism I, the molded article ejector mechanism J, and the slide K, which supports the mold feed mechanism L. The several mechanisms B, C, G, H, J and L are operated by the pneumatic circuit shown in Fig. 18, while their operation, along with that of the devices D, E, E' and I are effectively controlled by the electric system illustrated in Fig. 20, as will be described more in detail below.

Frame

Referring to Figs. 1 and 2, the suporting frame A consists of four vertical angle irons 30 welded at each end to channel irons 31 which are reinforced by braces 32 to withstand the thrust of injection unit C. Frame A is held upright by struts 33 and cross pieces 34 which are welded to the frame and each other, thereby forming a base which may be mounted on rollers (not shown) for making the machine portable, if desired.

Stock feed mechanism

As seen in Fig. 1, the rubber or rubber-like stock S is preferably in the form of a solid tube which may be coiled up on a circular table 35 rotatably mounted on shaft 36. Stock S is fed to the injection unit C by stock feed mechanism B. As seen more clearly in Figs. 3 and 16, mechanism B comprises a platform 37 which is secured to injection unit C for vertical movement within frame A, and is shown in its lowermost position as resting on cross-piece 38 in frame A. Mounted on platform 37 by means of spaced legs 39 is a double-acting pneumatic motor 40 having an electrically controlled, four-way solenoid valve 41 which controls the movement of piston 42. When terminal 41a of valve 41 is energiezd, the piston 42 advances, and upon energization of terminal 41b, piston 42 retracts. At one end, piston 42 is provided with a head 43 which has a pair of jaws 44 pivotally mounted thereon. The jaws 44 are preferably made of split pieces of pipe and are provided at one end with bearings 45 rotatably mounted on rods 46 in piston head 43, and with pins 47 adjacent the other end for securing tension spring 48, which resiliently urges the jaws 44 together and into firm engagement with stock S.

The stroke of piston 42 may be regulated by engagement between piston head 43 and stop bolt 49 which is adjustable in nut 50 on motor 40. Piston head 43 is also provided with a lug 51 which engages switch $S_{17}$, for actuating valve 41 to reverse piston 42 at the end of its feeding stroke. Spaced from movable jaws 44 is a similar pair of stationary jaws 52 having bearings 53 at one end pivotally mounted on rods 54 extending up from platform 37, and pins 55 adjacent the other end for securing tension spring 56 which resiliently forces jaws 52 against stock S. Each of jaws 44 and 52 is sharpened along its edges contacting stock S so that a good grip is obtained. As piston 42 moves from right to left, jaws 44, which move therewith, grip stock S to feed it to the injection unit C while the stationary jaws 52 are urged apart against the force of spring 56 by the moving stock S. When piston 42 recedes, the movable jaws 44 open up to slip over the stock S, while the stationary jaws 52 grip the stock and prevent it from moving back with movable jaws 44.

Injection unit

The injection unit C, which is mounted within the lower part of frame A and is connected to stock feeding mechanism B, as best shown in Figs. 1 and 3, is basically an assembly of the injection cylinder head 57, injection cylinder 58, injection plunger 59 and hydraulic injection-force motor 60, which assembly is vertically positioned by hydraulic lift motor 61. Referring to Fig. 4, the various components of the injection unit C are held in assembled relationship by two vertical channel irons 62 welded to cross-pieces 63, 64 at their top and bottom, respectively. These cross-pieces are slidably mounted on guide rods 65 which are secured in lugs 66 on angle irons 30 of frame A by nuts 67. The upward movement of the assembly is limited by two cross-bars 68 (only one of which is shown) on frame A, which are engageable with the upper edge of cross-piece 64. Either of bars 68 may be provided with a cut-out section 69 to accommodate the hydraulic hose connection to injection force motor 60, when the injection unit C rises.

Two steel bars 70, which are attached to channels 62 by bolts 71, serve to connect the cylinder head 57 thereto, the head 57 and bars 70 being secured together by bolts 72. As seen in Figs. 1 and 3, one of bars 70 is provided with a lug 70a which closes switch $S_{14}$ on frame A as injection unit C is lowered, for a purpose to be described later. Referring back to Fig. 4, head 57 is provided with a cylindrical passage 73 which is flared at its bottom to meet the larger internal diameter of cylinder 58. At its top, passage 73 tapers inwardly to form a seat for the injection nozzle 74 which is soldered therein. As seen in Figs. 3a and 4a, nozzle 74 is preferably provided with a thin piece of wire W which extends diametrically across the top of the nozzle and even with the upper edges thereof. Wire W is preferably bent into U-shape and provided with lugs W' which may be soldered in holes 74a in the periphery of nozzle 74. As will be seen below, this wire W provides an effective means for severing the stock S at the correct point in the mold to substantially eliminate flash in the finished article. As seen in Fig. 4, head 57 is also provided with lugs 75 which project slightly above nozzle 74 and heating coils 76 for purposes to be described below. The injection cylinder 58 is held in position within recess 77 in cylinder head 57 by means of a plate 78 which is secured to the bottom of plates 79 by bolts 79. Cylinder 58 is also heated by coils 80, as will be explained below. Plate 78 has a hole 81 for the passage of injection plunger 59 on the end of piston rod 82 of injection-force motor 60. As a plunger 59 rises, it closes a normally open switch $S_{11}$ which actuates a timing mechanism for controlling the duration of the injection operation, as will be described later in detail. In order that plunger 59 can reciprocate in cylinder 58 without creating side stresses, motor 60 is pivoted on a steel ball 83, which rests in shallow pits in cross-bar 64 and in plate 84 fastened to the bottom of motor 60. The tie-rods 85 of motor 60 also pass through cross-bar 64 to secure motor 60 thereto and to permit plunger 59 to be retracted in injection cylinder 58 without any danger of motor 60 being unseated from ball 83. Only the slightly enlarged upper portion 59a of plunger 59 fits cylinder 58 closely so as to prevent any binding between the plunger and cylinder 58.

As stated previously, the injection unit C is raised and lowered by lift motor 61 in the following manner. Cross-bar 64 rests upon a steel ball 86 which is located in shallow pits in the cross-bar and in the ramcap 87 of piston rod 88 in motor 61. In turn, motor 61 is similarly supported on another steel ball 89 located in shallow pits in the bottom of motor 61 and in channel iron 31. This construction also prevents build-up of undesirable side stresses as ramcap 87 moves the injection unit C up and down. The tie-rods 90 of motor 61 extend through channel iron 31 to secure motor 61 thereto in a substantially vertical position.

Referring back to Fig. 1, it will be noted that there are separate mechanisms for actuating injection force-motor 60 of injection unit C and lift motor 61 which moves the injection unit up and down. Mounted on the left strut 33 is a double-acting air motor 91 which is actuated by an electrically controlled 4-way solenoid valve 92 having terminals 92a and 92b which cause piston 94 to advance and retreat, respectively. Motor 91 in turn operates a 4-way, Barksdale type, air-water valve 93. As piston 94 of motor 91 reciprocates it actuates valve 93 through pivotal links 95 and 96. In the position shown, hydraulic line 97 is connected to supply and line 98 is connected to exhaust whereby ramcap 87 of motor 61 is forced up to lift injection unit C. Mounted on the right strut 33, is another double-acting air motor 99, which is actuated by a 4-way solenoid valve 100 having terminals 100a and 100b which cause piston 102 to advance and retract, respectively. Motor 99 in turn operates a 4-way, Barksdale type, air-water valve 101. As piston 102 of motor 99 reciprocates, it actuates valve 101 through pivotal links 103 and 104. In the position shown, hydraulic line 105 is connected to exhaust and line 106 is connected to supply for preventing injection plunger 59 from forcing stock S up into passage 73 in injection cylinder head 58 and through nozzle 74 as occurs during the actual injection operation. As piston 102 retracts, lug 102a thereon closes momentarily, a one-way impulse switch $S_{13}$ which causes motor 91 to retract under certain conditions to be described.

Referring back to Figs. 3 and 16, the physical and operative connections between the injection unit C and stock feed mechanism B will now be described. As will be apparent, the platform 37 is rigidly secured to plates 70 by flanges 107 bolted to each. This locates platform 37 in such a position that the stock S is aligned with intake aperture 108 in injection cylinder 58. This alignment is maintained since the stock feed mechanism B moves up and down with injection unit C. As the injection plunger 59 moves upwardly, it severs the stock S at aperture 108 and progressively forces the stock S within cylinder 58 above outlet 109, into head 57 and through nozzle 74. Any excess stock S in cylinder 58 is permitted to escape through the smaller outlet 109 which is positioned opposite to and slightly above inlet 108. Just as in a pump, the injection unit C must be primed until head 57 is filled and cylinder 58 is substantially filled with raw stock S before injection may take place. This may readily be done by manually operating air motor 99, which actuates injection-force motor 60, and feed motor 40 until the stock S appears at the top of nozzle 74, as will be explained more fully below. Alternatively, the machine may be set in automatic operation, with the result that no actual molding will occur until a sufficient amount of stock S has been supplied. As the stock S passes into cylinder 58 and head 57 it is prewarmed by heating coils 80 and 76 respectively so that it will be sufficiently softened to flow readily through nozzle 74.

Mold Landing Device

Mounted above and around injection cylinder head 57 is the mold landing device D, as seen in Figs. 3 and 4. The device comprises a pair of inverted U-shaped supports 110 the open ends of which have outwardly-extending pins 111 pivotally mounted in bearings 112 on angle irons 30 of frame A. Supports 110 also have landing bars 113 welded thereto, which bars are triangular in cross-section and extend along the closed ends of supports 110. These landing bars 113 are normally urged together by tension springs 114 to keep the mold plates elevated above the injection cylinder until the injection unit C is lifted to push the stacked mold plates up into the lower mold column support E' and the heating and guiding unit F. As the cylinder head 57 moves up, lugs 75 thereon push the landing bars 113 aside against the action of springs 114 and support the mold plates.

Mold construction

In order to fully describe the purpose and function of the mold landing device D and lugs 75 on injection cylinder head 57, reference will now be made to Figs. 21, 22 and 23. There is illustrated a typical multi-part mold 115 which may be used in the machine embodying the invention. Mold 115 preferably comprises a cavity plate 116 and plug plate 117. Cavity plate 116 is rectangular in shape and is provided with lugs 118 extending along two of its sides. The interior of cavity plate 116 is hollowed out to the shape of the particular article 119 being molded. This article 119 is a shock-absorbing mounting having a flat circular top 120 and a cylindrical nipple 121 with a tapered end 122. Accordingly, cavity plate 116 is provided with a shallow circular recess 123 and a cylindrical bore 124 tapered at one end 125. In addition, cavity plate 116 is provided with a cylindrical sprue 126 which extends to tapered end 125 of cylindrical bore 124, and which is also tapered at its opposite end 127 to facilitate the reception of plug plate 117. The plug plate 117 is also rectangular in shape as is cavity plate 116, and approximately the same size so that it coextends with lugs 118 on cavity plate 116. In addition, plug plate 117 has a plug 128 which mates with cylindrical sprue 126 in cavity plate 116. The relationship between cavity plate 116 and two adjacent plug plates 117 when assembled to form the cavity for molding article 119 is illustrated in Fig. 23.

Referring back to Figs. 3 and 4, a cavity plate 116 is shown in position on landing bars 113 over injecttion cylinder head 57. As will be apparent, the bars 113 support plate 116 high enough above head 57 so that nozzle 74 is not engaged or damaged thereby. As the head 57 rises and lugs 75 push bars 113 aside, the lugs 118 are supported by lugs 75, the bottom of cavity plate 116 resting on top of head 57 and nozzle 74 projecting into sprue 126, as seen in Fig. 4a. When a plug plate 117 is supported on bars 113, as shown in Fig. 2 it is also high enough above head 57 to prevent damage of nozzle 74. As head 57 rises, lugs 75 engage the lower surface of plug plate 117 (Fig. 2a) and are slightly taller than the projecting portion of nozzle 74 so that it will not be damaged by plug plate 117 at this point either. Whenever a mold plate (either cavity or plug) is properly positioned over injection unit C on landing device D, it closes signal switches $S_6$, $S_{6'}$ on frame A, the function of which will be specified below.

Upper and lower mold column supports

As the stock S is injected into each cavity plate 116, the head 57 pushes the cavity plate up into the lower mold column support E'. Likewise, the plug plate 117 is pushed up by head 57 shortly thereafter to close the sprue 126 in cavity plate 116. This continues until the molds 115 are stacked one upon the other in a column which fills the space between the upper and lower mold column supports E and E', the detailed construction of which is shown in Figs. 2, 5 and 6.

Referring to Fig. 2, the upper and lower mold column supports E, E', are shown as assembled on frame A, above injection unit C and below the mold disassembly mechanism G. As seen in Fig. 5, the lower support E' comprises a pair of oppositely disposed toggle arms 129 which are bifurcated at their adjacent ends to form U-shaped legs 130 having outwardly extending pins 131 pivotally mounted on cross-bars 132 welded to angle irons 30 of frame A. Within legs 130 are smaller U-shaped arms 133 pivotally mounted in legs 130 by means of pins 134 which lie parallel to pins 131 but are positioned farther apart for a purpose to be explained below. Mounted on each of arms 133 and depending downwardly therefrom are a pair of spaced pawls 135 having prongs 136 at their free ends. As will be apparent, arms 129 can oscillate on pivots 131, their upward movement being limited by stops 137 welded to angle irons 30, and their downward movement being constrained by tension springs 138.

Attached to the upper ends of springs 138, as shown in Fig. 6, is a similar pair of toggle arms 139 which form part of the upper mold column support E. Arms 139 are bifurcated at their inner ends to form U-shaped legs 140 having outwardly extending pins 141 pivotally mounted on cross-bars 142 (only one of which is shown) welded to angle irons 30 of frame A. Within legs 140 are smaller U-shaped arms 143 pivotally mounted in legs 140 by means of pins 144 which lie parallel to pins 141 but are positioned farther apart for a purpose to be explained below. Mounted on each of arms 143 and extending upwardly therefrom are a pair of spaced pawls 145 having prongs 146 at their free ends. As will be evident, arms 139 can oscillate about pivots 141, their movement being limited by upper stops 147 and lower stops 148 welded to frame A. Toggle arms 139 are each provided with insulated contacts 139a for closing switches $S_3$, $S_4$ on stops 148 and switches $S_7$, $S_8$ on stops 147 for a purpose to be described below. Each of arms 143 is also provided with levers 149 extending towards and underneath the opposite arm 143, which levers 149 are connected to upwardly extending chains 150 depending from solenoids 151 (only one of which is shown). Levers 149 are also connected to tension springs 152 depending downwardly therefrom and attached to bars 152a which extend outwardly from frame A, as also seen in Fig. 2. The springs 152 tend to pivot arms 143 inwardly, urging the opposite pawls 145 towards each other; however, when solenoids 151 are actuated they overcome the force of springs 152 and rock pawls 145 apart.

Referring to Fig. 2, the actuation of upper and lower mold column supports E and E' will now be described. Before the lift motor 61 pushes injection unit C upwards to push a mold plate on landing bars 113 against the bottom of the mold column, the mold disassembly unit G has forced the mold column downwardly a slight distance. This causes the mold column to pull down on lower pawls 135, and since the pivots 134 of pawl carrying arms 133 are positioned outwardly of pins 131 (as seen in Fig. 5), the toggle arms 129 will rock downwardly. Springs 138 will be placed under tension and, in turn will pull down on upper toggle arms 139 until both upper toggle arms 139 and the lower toggle arms 129 assume their lower dotted line position. As this occurs, the upper pawls 145, even though their pivots 144 are farther apart than pivots 141 (as seen in Fig. 6), will not rock away from each other because of springs 152 acting on levers 149 to hold pawls 145 over the top mold in the column. However, as soon as disassembly unit G has pushed the mold column down a short distance, pressure contact between the uppermost mold plate and prongs 146 of pawls 145 is relieved, and then unit G actuates solenoids 151 to rock pawls 145 apart against the action of springs 152 for a purpose to be described below in connection with the detailed description of unit G.

As injection unit C rises above landing bars 113, the mold plate (whether it be a plug plate 117 as illustrated, or a cavity plate 116) resting on head 57 forces prongs 136 of lower pawls 135 apart, the injection unit C pushing the mold column upwardly against the force of mold disassembly unit G because the downward force exerted by the latter is considerably less than the upward force of lift motor 61. As the lowermost mold plate clears prongs 136, pawls 135 are caused by gravity to pivot toward each other to support the lowermost mold plate. In the case of a cavity plate 116, as in Fig. 2, the prongs 136 fit underneath lugs 118, while in the case of a plug plate 117, prongs 136 engage the bottom of the plate at each side, just as do landing bars 113 in Fig. 2. After the mold column is pushed up a short distance the mold disassembly unit G which has now become interengaged with the uppermost mold plate in the column and which is being forced up with the column, deactivates solenoids 151, whereupon springs 152 rock pawls 145 over the next mold plate which is now in the position formerly occupied by the uppermost mold plate.

The upward force exerted by injection unit C against the mold column is now transmitted to pawls 145, which, because of their peculiar mounting noted above, rock toggle arms 139 upwardly toward their stops 147 (Fig. 6). Through springs 138, arms 139 rock lower toggle arms 129 upwardly towards their stops 137 (Fig. 5). When the mold column has been pushed up until upper pawls 145 reach their positive stops 153 as shown in Fig. 7, the upper and lower toggle arms 139, 129, are in their upper dotted line positions in Fig. 2. Referring to Figs. 7 and 8, there are four stops 153, one for each of upper pawls 145. These stops are welded to plates 154 which are attached loosely to angle irons 30 by bolts 155. Thus the stops 153 act as a shock absorber in transmitting the thrust of motor 61 and the mold column to channel iron 31, thereby relieving pawls 145 of extra strain.

When this occurs, the mold disassembly unit G continues to move up under its own power and eventually, lift motor 61 recedes to lower injection unit C. The mold column is then completely supported between the upper and lower mold supports E, E'. The weight of the column bears down on lower pawls 136 which causes the lower toggle levers 129 to pivot downwardly to their solid line position. Simultaneously, springs 138 rock upper toggle arms 139 to their solid line position. It should be noted that the upper and lower mold column supports E, E' must clamp the stacked molds together to prevent the mold plates from separating and the stock S from expanding into a porous condition. In addition, the lower mold support E' must bear the weight of the mold column itself. Accordingly, the lower toggle arms 129 are designed to have a slightly greater mechanical advantage than upper arms 139. This is accomplished by making the distance between each of pins 134 and 131 (Fig. 5) less than that between each of pins 144 and 141 (Fig. 6). For example, if each of arms 129 and 139 is 10" long (i. e.: the distance between pivots 131 or 141 and spring 138), the distance between pivots 134 and 131 would be ½" while the distance between pivots 141 and 144 would be ¾". This would give the arms 129 a mechanical advantage of 20 while arms 139 would have a mechanical advantage of 13.3.

*Mold guide and heating unit F*

Surrounding the mold column and extending through mold supports E, E' is the guide and heating unit F, as seen in Figs. 1, 2 and 9. Referring to Figs. 2 and 9 particularly, the unit F comprises an elongated, box-like structure having side walls 156, 157 made of any suitable insulating material such as asbestos sheets. The sides 156 are attached in any suitable manner to two vertically spaced pairs of plates 158 which are bolted to angle irons 30 of frame A. The other two sides 157 are similarly attached to plates 159, which are preferably welded to plates 158. Mounted within unit F, at each corner formed by side walls 156, 157 are heating rods 160 which may be attached to the side walls by any suitable means, not shown. These rods 160 may consist of coiled wires embedded in a suitable insulating material, and their temperature may be regulated by a rheostat, not shown. In between heating rods 160 are the guide rods 161, one bolted on each of side walls 156 and two bolted on each of side walls 157. As will be apparent, the guide rods 161 maintain the mold plates upright and in vertical alignment, the heating rods 160 uniformly heat the article 119, in the cavity plates 116, and the insulating side walls 156, 157 prevent heat loss from unit F in order to complete molding of the article 119 from stock S under uniform temperature. Moreover, upon reference to Fig. 1, it will be noted that the guide rods 161 and pawls 135, 145 are so spaced from each other that there is no interference therebetween, and the guide rods 161 are spaced far enough apart to permit coils 76 on injection head 57 to pass freely therein as injection unit C pushes a mold plate up against the bottom of the mold column.

Mold disassembly mechanism

Mounted above the mold column and the heating and guiding unit F is the mold disassembly mechanism G. Unit G, as shown in Figs. 1, 2, 6 and 7, comprises a double-acting pneumatic motor 162 which is rigidly secured to top channel iron 31 in frame A and actuated by an electrically controlled, four-way solenoid valve 163 having terminals 164 and 165. When terminal 164 is energized, it causes piston rod 166 to go down, while energization of terminal 165 retracts piston rod 166, as will be explained below. Referring to Figs. 6 particularly, the piston rod 166 of motor 162 is provided with a piston foot 167 having depending toes 168. Pivotally mounted on pins 169 passing through foot 167 are a pair of pawls 170 having prongs 171. A pair of rods 172 project outwardly from the sides of piston foot 167 near its top and pass freely through elongated holes 173 in pawls 170. The holes 173 are large enough so that pawls 170 may rock about pivots 169 without interference from rods 172. Rods 172 are designed to actuate switches $S_{19}$, $S_5$ and $S_9$, as will be described in detail below. A projection 174 extends outwardly from one of rods 172 and has a chain 175 extending downwardly therefrom to actuate switch $S_7$ for a purpose to be explained. Opposite prongs 171, are another pair of rods 176 which extend outwardly therefrom and which are attached to tension springs 177. Referring to Fig. 2, springs 177 connect rods 176 with similar rods 178 which are rigidly attached to frame A. Thus, by pulling down on rods 176 springs 177 urge pawls 170 toward each other to firmly grip the mold plates.

In order to prevent piston foot 167 from turning as it moves up and down, two of plates 154, as seen in Figs. 7 and 8, are provided with guide plates 154a bolted thereto. These guide plates are spaced from each other to permit rod 172 to pass freely between them but are close enough together to prevent piston foot 167 from twisting. This ensures that toes 168 will properly engage the upper surfaces of the mold plates, particularly lugs 118 on cavity plate 116; likewise, pawls 170 will be correctly positioned so that they will securely engage the undersides of the mold plates, for example, the lugs 118 of cavity plate 116, all as shown in Fig. 2.

Mold re-positioning device

Referring to Figs. 1 and 10, the mold re-positioning device H is mounted on the upper left hand side of frame A by means of a horizontal strut 179 which is preferably welded thereto. Device H comprises a double acting pneumatic motor 180 secured to strut 179 by any suitable means and actuated by an electrically controlled, four-way solenoid valve 181 having terminals 181a, 181b. When terminal 181a is energized, valve 181 causes piston rod 182 to advance from left to right to remove a mold plate from the mold disassembly mechanism G and to push the mold plate onto the release-catch lever mechanism I. Upon energization of terminal 181b, piston rod 182 retracts. Piston rod 182 is provided with a tripper 183 for actuating switch $S_{18}$ as it retracts, for a purpose to be described below, and is also provided with an enlarged head 184 for engagement with the mold plate.

Mold release-catch lever mechanism

As also seen in Fig. 1, the mold release-catch lever mechanism I is mounted on the upper right hand side of the frame A. Device I, which is illustrated in detail in Figs. 10, 11, 12, 13, and 14, comprises a pair of spaced plates 185 rigidly supported on cross-piece 186 of frame A. Welded inside plates 185 are vertically spaced pairs of rails 187 for guiding the mold plates after they are removed by device H from unit G. A lever 188 having an upwardly extending plate 189 bolted thereto is pivotally mounted on the outside of one of plates 185 by means of a pin 190 passing through plate 189. The end of lever 188 adjacent frame A is normally biased in a counter-clockwise direction by a tension spring 191 attached thereto and to frame A by means of a short stub 192. However, a vertical plate 193 extends upwardly from this end of lever 188 and is provided with a cam 194 bolted thereto for engagement with a mold plate which pivots lever 188 in a clockwise direction. The opposite end of lever 188 is provided with an upstanding catch 195 either for positioning a mold plate over the ejector mechanism J when in the position shown or for releasing a mold plate to go down slide K when lever 188 is pivoted clockwise. A selector switch $S_{10}$ is mounted on the outside of the other plate 185 by means of a plate 196 bolting the two together. As seen in Figs. 12 and 13, the switch $S_{10}$ is so positioned that it is actuated only by a cavity plate 116 while a plug plate 117 passes freely thereunder, for a purpose to be described in detail below.

Ejector mechanism

Positioned below the release-catch lever mechanism is the ejector mechanism J which is bolted to a platform 197 welded to frame A, as shown in Figs. 1 and 10. Mechanism J comprises a double-acting pneumatic motor 198 which is actuated by an electrically controlled, four-way solenoid valve 199 having terminals 199a and 199b. Upon energization of terminal 199a, valve 199 causes piston rod 200 of motor 198 to go up and eject a cured article 119 from a cavity plate 116. To retract piston rod 200, terminal 199b is energized.

Slide

Referring to Fig. 1, slide K is secured to release-catch lever mechanism I at its upper end and to frame A adjacent mold landing mechanism D at its lower end, and comprises oppositely disposed, angularly inclined upper and lower legs 201 and 202. Upper leg 201, as also seen in Figs. 10, 11 and 14 is composed of a pair of spaced plates 203 secured together at intervals throughout its length by cross-pieces 204 welded to the bottom sides thereof. Plates 203 are provided with rails 205 welded along their lower inside edges for guiding the mold plates. A short distance from mechanisms I and J, a pair of switches $S_{15}$, $S_{16}$ are bolted to the upper inside edges of plates 203 and are positioned approximately opposite each other. Fig. 14 illustrates switches $S_{15}$ and $S_{16}$ as being so positioned that only switch $S_{15}$ will be actuated by a plug plate 117 while both $S_{15}$ and $S_{16}$ will be actuated by a cavity plate 116. As will be explained more in detail below, these switches $S_{15}$, $S_{16}$ together with switch $S_{10}$, control the ejector mechanism J so that it operates only when a cavity plate 116 lies above it, as in Fig. 10.

At their lower ends, as shown in Figs. 1 and 15, plates 203 are preferably welded to a similar pair of spaced plates 206 extending in the opposite direction. This joint is reinforced by vertical plates 207 which are welded to each of plates 203 and 206 and maintain them in proper alignment. Plates 206 are also held in the proper spaced relationship with each other by cross-pieces 208 welded to their bottom sides and are provided with rails 209 similar to rails 205 for guiding the sliding mold plates. At their upper ends 210, the rails 209 are wider, being notched out at 211 and provided with projections 212. A plastic bumper 213 is secured within notches 211 to cushion the fall of the mold plates as they fall from upper leg 201 to lower leg 202. As will be apparent, the rails 205 are cut back to permit the mold plates to fall backward as they strike bumper 213, and the projections 212 assist this action. Additional guide bars 214 are preferably secured inside the top of plates 203 to insure that the mold plates execute the correct motion in falling backwards, and a shield 215 of bent sheet metal may be secured to plates 206 and 207 to prevent the mold plates from jumping out of slide K as they fall from leg 201 to leg 202. At their lower ends, plates 206 and rails 209 are curved to provide a horizontal approach to the mold landing mechanism D, and are welded to cross-piece 216 of frame A as seen in Fig. 3. Mounted on one of plates 206 is switch $S_1$, which is closed by the mold plates to actuate the mold feed mechanism L.

Mold feed mechanism

Continuing to refer to Fig. 1, the mold feed mechanism L is rigidly attached to the lower leg 202 of slide K by two pairs of vertical plates 217 and 218 secured to plates 206. Mechanism L comprises a double-acting pneumatic motor 219 actuated by an electrically controlled, four-way solenoid valve 220 having terminals 220a and 220b. Upon energization of terminal 220a, valve 220 advances piston rod 221 to push the mold plates into position over landing mechanism D, as shown in Fig. 3. Piston rod 221 of mold feed motor 219 is also provided with a lug 223 which closes switch $S_2$ as the piston pushes the mold plates to their correct position on landing bars 113 and in contact with switches $S_6$, $S_{6'}$, as also shown in Fig. 17. When terminal 220b is energized, piston rod 221 retracts. Although the mold plates may occasionally have enough momentum from sliding down slide K to pass onto landing mechanism D, it is both desirable and necessary that mold feed mechanism L be employed because switches $S_2$, $S_6$ and $S_{6'}$, among others, must be closed before lift motor 61, which raises injection unit C, and mold disassembly unit G can be actuated.

Pneumatic control circuit

Referring now to Fig. 18, the pneumatic control circuit of the machine will be described. From a conventional air compressor (not shown) air at 100 p. s. i. is fed along supply line 224 through a conventional shut-off valve 225, a filter 226 which separates out any water which may be present in the line, and a pressure regulator 227, which reduces the air pressure to 80 p. s. i., to supply the various air motors. Four of the air motors operate on 80 p. s. i., and they are motors 91, 162, 99, and 198 fed through lines 228, 229, 230 and 231 respectively. As will be apparent from Fig. 1, motor 91 actuates valve 93 for raising and lowering lift motor 61, motor 162 actuates piston foot 167 of mold disassembly unit G, motor 99 actuates valve 101 for raising and lowering plunger 59 of injection unit C, and motor 198 actuates plunger 200 of ejection mechanism J. The other three air motors are operated at further reduced pressures, as seen in Fig. 18. A pressure regulator 232 is located in trunk line 233 for reducing the 80 p. s. i. to 15 p. s. i. for actuating air motors 219 and 40 through branch lines 234 and 235 respectively. Another pressure regulator 236 is located in trunk line 237 for reducing the 80 p. s. i. to 35 p. s. i. for operating air motor 180. Referring to Fig. 1 again, air motor 219 actuates plunger 221 of mold feed mechanism L, motor 40 actuates piston rod 42 of stock feed mechanism B, and motor 180 actuates plunger 182 of mold re-positioning device H. Although the electrically controlled, four-way solenoid valves which actually control the reciprocation of the aforesaid motors are not illustrated in Fig. 18, they are shown schematically in Fig. 1 with their terminals which are selectively energized by the electrical control system to be described. The actual construction of the valves forms no part of the present invention, as they are actually incorporated in the aforesaid air motors which are commercially available.

Hydraulic control system

Referring to Fig. 19, there is illustrated the hydraulic control system for actuating lift motor 61 and injection-force motor 60 of injection unit C. Water at 460 p. s. i. is supplied to main line 238 through a conventional shut-off valve 239 to trunk lines 240 and 241. From line 240 the water passes through a throttle valve 244 to a conventional, Barksdale type, 4-way air-water valve 93 and into the lower part of lift motor 61 through line 97 to raise injection unit C at the desired speed, the water in the upper part of motor 61 exiting through line 98, valve 93 and trunk line 242 to main exhaust line 243. When air motor 91 (Figs. 1 and 18) is actuated to reverse valve 93, the lift motor 61 is likewise reversed to lower injection unit C, the water being fed through line 98 and exhausted through line 97.

The 460 p. s. i. water in line 241 passes through a conventional, Barksdale type, 4-way air-water valve 101 into the lower part of injection-force motor 60 through line 105, the water in the upper part of motor 60 exhausting through line 106 and valve 101 to main exhaust line 243. Thus motor 60 forces injection plunger 59 of injection unit C (Figs. 1 and 3) upwardly to inject stock S into the cavity plate 116. When air motor 99 (Figs. 1 and 18) reverses valve 101, motor 60 is likewise reversed to retract plunger 59, the water being fed through line 106 and exhausted through line 105.

As will be apparent, the forces necessary to raise lift motor 61 and to actuate injection-force motor 60 are much greater than those required to actuate the various air motors noted above. Accordingly, the 100 p. s. i. pneumatic system is not adequate to directly raise injection unit C which lifts the mold column, nor to perform the actual injection operation; thus the 460 p. s. i. hydraulic system is employed for this purpose. However, since the air motors 91 and 99, can be conveniently operated by the electrical control system through solenoid valves 92 and 100 respectively (Fig. 1), they are advantageously utilized to actuate the 4-way Barksdale type, air-water valves which control the operation of lift motor 61 and injection-force motor 60.

Electrical control system

Referring to Fig. 20, the electrical system for controlling the operation of the various components of the automatic molding machine will now be described. Electrical energy reaches the machine through 110 volts A. C. lines 245. Part of this energy is utilized at that voltage and part is transformed to 8 volts by transformer 246 the primary coil 247 of which is connected across lines 245 by line 248 having a cut-out switch $S_{20}$. The secondary coil 249 of the transformer 246 is connected to the 8 volt lines 250, 251 by line 252 having cut-out switch $S_{21}$. The current travels from terminal 255 of secondary coil 249 through switch $S_{21}$ and line 250 to the various 8 volt circuits, and back to terminal 253 through lines 251 and 252, each of which are connected to ground at 254.

Upon closing switch $S_{20}$, line 248 completes a circuit across 110 volt supply lines 245 to energize transformer 246. As soon as switch $S_{21}$ is closed the 8 volt circuits are ready to be energized by the various switches $S_1$ through $S_{10}$ and $S_{12}$ through $S_{18}$. Upon closing of switch $S_1$ by contact with a mold plate, current flows along line 256 to terminal 220a of solenoid valve 220 which actuates motor 219 of mold feed mechanism L. Likewise, when switches $S_2$, $S_3$, $S_4$, $S_5$, $S_6$ and $S_{6'}$, which are all in series, are closed, current flows along line 257 to terminal 92a of solenoid valve 92 which actuates motor 91 for raising lift motor 61. Before this can occur, however, certain components of the machine and the mold plates must be in proper position. For example, $S_2$ must have been closed by mold feed mechanism L; $S_3$ and $S_4$ must have been closed by upper mold support E, $S_5$ must have been closed by mold disassembly unit G, and $S_6$ and $S_{6'}$ must have been closed by a mold plate. As series switches $S_7$, $S_8$ are closed by upper mold support E, current flows along line 258 to terminal 165 of valve 163 which retracts motor 162 of mold disassembly device G, and along line 259 to terminal 220b of valve 220 which reverses motor 219. Upon closure of switch $S_9$ in line 259a by the retracting motor 162, selector switch $S_{10}$ may be in one of two positions. When $S_{10}$ is pushed by a cavity plate 116 (Fig. 13) into the upper position, it energizes line 260, connecting terminal 100a of valve 100 which actuates air motor 99 for operating injection unit C. As $S_{11}$, which is in the 110 volt circuit and normally open, is closed by operation of injection unit C, line 262 is energized to operate timer T, which controls the duration of the actual injection operation. When the set time has elapsed, the timer T, which actually has 8 volt switch $S_{12}$ built into it, mechanically closes switch $S_{12}$, thereby energizing line 263 and terminal 100b of valve 100, which reverses air motor 99 for deactivating injection unit C. As this occurs, motor 99 closes one-way impulse switch $S_{13}$ to energize line 264 and momentarily connect terminal 92b of air motor 91 to lower the lift motor 61 and injection unit C.

On the other hand, when $S_{10}$ is permitted by a plug plate 117 (Fig. 12) to remain in the lower position no injection is to occur; thus, it energizes line 261 connecting terminal 92b of valve 92, which reverses motor 91 for lowering motor 61. When lift motor 61 and injection unit C recede, one-way impulse switch $S_{14}$ is closed to energize line 265 and momentarily connect terminal 181a of valve 181, which actuates motor 180 of mold re-positioning device H. Next, switch $S_{15}$ is closed by either a cavity or plug plate, energizing line 266 and connecting terminal 181b of valve 181, which retracts motor 180 of mold re-positioning device H. At the same time, normally closed selector switch $S_{16}$ in line 267, may be in either one of two positions. If it is pushed by a cavity plate 116 into the upper, open position (Fig. 14), terminals 199a and 41a will not be connected. If it is permitted by a plug plate 117 to remain closed (Fig. 14), line 268 is energized to connect terminal 199a of valve 199, which actuates motor 198 of ejector mechanism J. In addition, line 269 is energized to connect terminal 41a of valve 41, which actuates motor 40 of stock feed mechanism B. As motor 40 completes its stroke, it closes switch $S_{17}$ which energizes line 270 connecting terminal 41b of valve 41, which reverses motor 40. As motor 180 fully retracts, it closes one-way impulse switch $S_{18}$ which energizes line 271 to connect terminal 164 of valve 163 which actuates motor 162 of mold disassembly device G. Switch $S_{18}$ also energizes line 272 to connect terminal 199b of valve 199, which retracts motor 198 of ejection mechanism J, in the event that motor 198 has been actuated by switch $S_{16}$. When motor 162 reaches the bottom of its stroke, it closes switch $S_{19}$, connected across 110 volt lines 245, which energizes line 273 and actuates relay R. 110 volt switch R′, which is actually built into relay R, then energizes lines 274 and 275 which actuate the two solenoids 151. Upon retraction of motor 162, switch $S_{19}$, relay R and switch R′ are opened and thus solenoids 151 are deenergized.

*Operation of machine*

Referring to Figs. 1 and 2, the operation of the automatic molding machine will now be described in detail. As a plug plate 117 comes down the slide K to the bottom of the mold column, it eventually comes to rest on the landing device D. Just before it reaches this destination, it momentarily closes a micro-switch $S_1$ on slide K. Switch $S_1$ actuates plunger 221 of air motor 219 to push the plug plate 117 onto landing bars 113 and into contact with signal switches $S_6$, $S_{6'}$. The next operation is to raise the injection unit C and push the newly arrived plug plate 117 up against the bottom of the mold column. Before this can occur, however, all previous motions must be completed. When plunger 221 has properly located plug plate 117 over landing bars 113, lug 223 thereon closes switch $S_2$ while plug plate 117 closes switches $S_6$, $S_{6'}$. Piston foot 167 should now be pushing down on the mold column, which action is indicated by rods 172 closing switches $S_5$ and $S_{19}$. The upper pawls 145 should have been rocked outwardly to be released from the mold column by solenoids 151, which are actuated by switch $S_{19}$, and this is indicated by engagement between insulated contacts 139a and switches $S_4$, $S_3$ which are closed thereby. As piston foot 167 engages the top mold plate (which is a cavity plate 116) pawls 170 are biased outwardly so that prongs 171 hook under lugs 118 on the cavity plate. When switches $S_2$ through $S_{6'}$, which are connected in series, are all closed, motor 91 can cause lift motor 61 to push injection unit C upwardly. As this occurs, the lugs 75 on injection head 57 (Fig. 2) push the landing bars 113 aside and the plug plate 117 rocks lower pawls 135 outwardly until it overlies prongs 136. In the meantime, the mold column is being pushed upwardly against the piston foot 167 of motor 162.

As the mold column forces piston foot 167 upwardly, switch $S_{19}$ is opened as soon as the top cavity plate 116 (now held by pawls 170) is above upper pawls 145. This deactivates solenoids 151, and springs 152 then rock pawls 145 together over plug plate 117 immediately below top cavity plate 116. It is to be noted that the cavity plate 116 is not as yet disengaged from the mold column, but that the mold column has merely been pushed up enough to raise the lugs 118 of uppermost cavity plate 116 above prongs 146 of upper pawls 145. The prongs 171 on pawls 170 and prongs 146 on pawls 145 are designed to fit easily into the space between lugs 118 of a cavity plate 116 and a plug plate 117 so that no interference with the mold disassembly operation will occur.

As the mold column continues to move upwardly, the now closed pawls 145 are forced up therewith until they reach their positive stops 153 which cushion and limit the upper movement of the mold column. At this point, upper levers 139 are pivoted upwardly until contacts 139a close switches $S_7$, $S_8$ (Fig. 2) which actuate valves 163 and 220 to pull back piston foot 167 of motor 162 and plunger 221 of motor 219 respectively. As piston foot 167 continues upward under its own power, rod 174 thereon pulls up on chain 175 which breaks the contact between one of toggle levers 139 and switch $S_7$, deenergizing valve 163, since piston foot 167 need not travel up any further. Simultaneously, one of rods 172 on piston foot 167 momentarily closes one-way microswitch $S_9$ which is connected to a normally closed selector switch $S_{10}$. Since a plug-plate 117 is under this switch $S_{10}$ (Figs. 10 and 12), it will remain closed; thus the current will flow to terminal 92b of motor 91 which actuates valve 93 to lower lift motor 61 and injection unit C. This is as it should be because another plug plate 117 is at the bottom of the mold column and no injection should occur.

On receding, the injection unit C momentarily closes a one-way switch $S_{14}$ by means of a projection 70a on one of bars 70 which make up part of the injection unit C. This connects terminal 181a of valve 181 which causes plunger 182 of motor 180 to push the cavity plate 116, which was picked up by pawls 170 of piston foot 167, between the rails 187 of horizontal bars 185 and to a position under switch $S_{10}$ (Fig. 10). At the same time, this cavity plate 116 pushes the preceding plug plate 117 over ejection unit J, the re-positioned plug plate 117 pushing the preceding cavity plate 116 down onto slide K. This precise re-positioning of the mold plates is made possible by the release-catch lever mechanism J. As a cavity plate 116 passes under switch $S_{10}$ it also engages cam 194 to pivot lever 188 clockwise and lower catch 195 which permits a cavity plate 116 over ejection unit J to go down slide K. As soon as cavity plate 116 has cleared cam 194, spring 191 pivots lever 188 counterclockwise, raising catch 195 which holds a plug plate 117 over ejection unit J. As a cavity plate 116 goes down slide K it closes switch $S_{15}$ which energizes terminal 181b of valve 181 which retracts plunger 182 of motor 180. This same plate also opens normally closed switch S$_{16}$ which prevents current from reaching terminals 199a and 41a of valves 199 and 41. This prevents plunger 200 of motor 198 of ejector unit J from rising because a plug plate 117 is now positioned thereover, and also prevents motor 40 of stock feed mechanism B from forcing stock into injection cylinder 58 which is still full, since a plug plate 117 is at the bottom of the mold column, and no injection has taken place. When plunger 182 nears the end of its retraction stroke, tripper 183 thereon closes one-way impulse switch S$_{18}$ which allows a momentary current to reach terminals 164 and 199b of valves 163 and 199 respectively. Valve 163 causes piston 166 and piston foot 167 of motor 162 to push down onto the mold column as before. Since plunger 200 of ejector motor 198 was not actuated, the current to terminal 199b of valve 199 will have no operative effect at this moment.

In the meantime, a cavity plate 116 reaches the lower end of the upper part 201 of slide K, hits bumper 213 (Fig. 15) and falls backward down the lower part 202 of slide K, as previously described. Immediately thereafter, this cavity plate 116 closes switch S$_1$ which actuates plunger 221 of motor 219 to push the cavity plate over landing bars 113 and into contact with switches S$_6$, S$_{6'}$. Upon completion of its stroke, plunger 221 closes switch S$_2$ by means of lug 223. As previously described, the downward movement of piston foot 167 in mold disassembly mechanism G closes switches S$_3$, S$_4$, S$_5$ and S$_{19}$. Since series switches S$_2$ through S$_6$, are closed, motor 91 causes lift motor 61 to push injection unit C upwardly to position a cavity plate 116 at the bottom of the mold column. As the mold column moves up, mold disassembly mechanism G picks up a plug plate 117 (which is now at the top of the column) in the same manner as it did cavity plate 116. As the upper pawls 145 reach their positive stops 153, switches S$_7$, S$_8$ and S$_9$ have been closed while switches S$_2$ through S$_{6'}$, and S$_{19}$ have been opened. Switches S$_7$, S$_8$ cause motor 162 to retract further with a plug plate 117 and plunger 221 of motor 219 to retract, as stated above. S$_9$ connects with S$_{10}$, and since a cavity plate 116 now lies under S$_{10}$ (Fig. 13) it energizes terminal 100a of valve 100 which actuates motor 99. Plunger 102 of motor 99 operates valve 101 to push injection plunger 59 upwardly to bite off a piece of stock S and inject the stock S through nozzle 74 of injection head 57 into a cavity plate 116, which is now at the bottom of the mold column (Fig. 4a). As plunger 59 goes up, it closes a normally open switch S$_{11}$ to start timer T which may be set for the desired interval during which injection takes place. When the set period of time has elapsed, timer T actuates built-in switch S$_{12}$ to energize terminal 100b of valve 100 which causes piston rod 102 of motor 99 to withdraw. This reverses valve 101 and causes piston 82 and plunger 59 of injection-force motor 60 to go down. As piston rod 102 retracts, lug 102a thereon closes switch S$_{13}$ which energizes terminal 92b of valve 92, thereby causing piston 94 of motor 91 to reverse valve 93 and lower plunger 88 of lift motor 61, which retracts injection unit C.

As this occurs, the mold column is then completely supported by lower pawls 135 engaging the undersides of lugs 118 on a cavity plate 116. In order to prevent any excess stock S from remaining in cavity plate 116 resulting in cured waste, the nozzle 74 in injection head 57 is provided with a wire W extending diametrically across the nozzle and even with the upper edges thereof as seen in Figs. 3a and 4a. Thus, as head 57 retracts and nozzle 74 is withdrawn from sprue 126 in cavity plate 116 (Fig. 4a) wire W severs the stock S in the nozzle cleanly from that in the mold, precisely at the juncture of the taper 125 of cavity 124 and sprue 126. As a result, the cavity plates 116 will be filled with just the right amount of stock S and cured waste is substantially eliminated.

As injection unit C continues to retract, it closes switch S$_{14}$ which actuates mold re-positioning unit H to push a plug plate 117 out of mold disassembly unit G and onto release-catch lever mechanism I. This plug plate pushes a cavity plate 116 over ejection unit J and another plug plate 117 down slide K (Fig. 10), the release-catch lever mechanism operating just as described previously. However, a plug plate 117 cannot actuate switch S$_{10}$ so that terminal 92b of valve 92 remains energized and thus lift motor 61 remains in retracted position. Likewise, the plug plate 117, going down slide K closes switch S$_{15}$ to retract plunger 182 of motor 180, but cannot open switch S$_{16}$ (Fig. 14). Thus, terminal 199a of valve 199 is energized and causes plunger 200 of motor 198 to eject the molded article 119 out of cavity plate 116. In addition, normally closed switch S$_{16}$ energizes terminal 41a of valve 41 which causes piston rod 42 of motor 40 to advance and feed stock S to injection cylinder 58, as previously described. As piston rod 42 completes its stroke, lug 51 on head 43 thereof trips switch S$_{17}$ which energizes terminal 41b of valve 41, thereby retracting plunger 42.

As plunger 182 of motor 180 completes its retracting stroke, tripper 183 thereon closes switch S$_{18}$ which causes mold disassembly device G to push down again, and which also energizes terminal 199b of valve 199 to retract plunger 200 of ejector motor 198. In the meantime, a plug plate 117 has passed down slide K and under switch S$_1$ to continue the automatic operation of the machine.

It will now be apparent, that the machine comprising the invention represents an entirely new concept in the molding of rubber or rubber-like parts, wherein all human labor normally employed at various stages of the molding operation has been completely eliminated by continuous, automatic operation.

While this invention has been shown and described in a certain preferred form, it is to be understood that various changes and modifications may be made therein by those skilled in the art without departing from the principles of the invention, the scope of which is to be determined by the appended claims.

Having thus described my invention, what I claim and desire to protect by Letters Patent is:

1. An automatic molding machine comprising means for supporting a plurality of stacked molds filled with moldable stock, means for assembling and filling said molds with said stock, means for feeding said stock to said mold assembling and filling means, means for disassembling said molds and ejecting molded articles therefrom, means for feeding said disassembled molds to said mold assembling and filling means, and electrical control means interconnecting said supporting means with each of the other aforesaid means to actuate the latter in proper sequence and timed relation for continuous and automatic operation of said machine.

2. An automatic molding machine comprising means for supporting a column of assembled molds filled with moldable stock, power operated means adjacent one end of said supporting means and column for assembling and filling said molds with said stock, power operated means adjacent said mold assembling and filling means for feeding said stock thereto, power operated means adjacent the other end of said supporting means and column for disassembling said molds and ejecting molded articles therefrom, power operated means for feeding said disassembled molds to said mold assembling and filling means, and electrical control means interconnecting each of the aforesaid power operated means with said supporting means to actuate the said power operated means in proper sequence and timed relation for continuous and automatic operation of said machine.

3. An automatic molding machine comprising a frame, means on said frame for supporting a column of stacked, assembled molds filled with moldable stock, means on said frame adjacent one end of said column for providing a landing for the molds when disassembled, power operated means reciprocable on said frame adjacent said landing means for assembling said molds in said column and for filling said molds with said stock, power operated means adjacent said reciprocable means for feeding said stock thereto, power operated means on said frame adjacent the other end of said column for disassembling said molds, means adjacent said disassembling means for receiving the disassembled molds therefrom, power operated means adjacent said disassembling means for removing said disassembled molds therefrom and for repositioning the same on said receiving means, power operated means adjacent said receiving means for ejecting molded articles from said disassembled molds, power operated means for feeding said disassembled molds to said landing means, and electrical control means interconnecting each of the aforesaid power operated means with said supporting, landing and receiving means to actuate said power operated means in proper sequence and timed relation for continuous and automatic operation of said machine.

4. In an automatic molding machine, means for supporting a column of stacked molds, said supporting means comprising a pair of spaced pawl mechanisms, each comprising an oppositely disposed pair of toggle levers having U-shaped legs pivotally mounted on said machine, an oppositely disposed pair of U-shaped arms pivotally mounted within said legs but outwardly of the pivotal mounting thereof, and spaced pawls extending from said arms for engagement with an end of said column, resilient means interconnecting the toggle levers in one of said pawl mechanisms with the toggle levers in the other of said pawl mechanisms for maintaining said toggle levers in proper spaced relationship.

5. In an automatic molding machine as in claim 4, each of said oppositely disposed, U-shaped arms in one of said pawl mechanisms having a rod extending therefrom towards the other of said arms, resilient means connected to said rods for closing said pawls into engagement with an end of said column, and power operated means connected to said rods for opening and disengaging said pawls from said column end.

6. In an automatic molding machine in which a plurality of molds is arranged and assembled in a vertical stack during a molding operation, means providing a landing, at a location adjacent and vertically aligned with one end of said stack, for disassembled molds delivered to said location from the other end of said stack, said landing means comprising a pair of substantially U-shaped supports each having a pair of legs and a transverse member interconnecting the respective legs adjacent one end of the latter, said pairs of legs being journaled adjacent their other ends on respective stationary parallel pivot means for angular movement of said supports toward and away from one another, said transverse members when in a predetermined spaced relationship being disposed at said location and adapted to jointly support therebetween said disassembled molds when delivered to said location, and resilient means operatively connected to said supports for normally biasing the same toward one another so as to maintain said transverse members thereof in said predetermined spaced relationship, whereby angular movement of said supports away from one another and against the force of said resilient means spaces said transverse members farther apart and enables a mold supported thereby to be transferred to said stack.

7. In an automatic molding machine, reciprocable means comprising an assembly slidably mounted on guide bars within said machine and first power operated means mounted on said machine for reciprocating the assembly to engage and move a column of stacked molds and to assemble said molds in said column, said assembly comprising an injection head having a nozzle, an injection cylinder secured to said injection head and second power operated means having a plunger reciprocable within said cylinder for injecting moldable stock into said molds when assembled in said column.

8. In an automatic molding machine as in claim 7, said nozzle having a wire extending transversely across the outer end thereof for severing said stock in said molds at the desired point therein as said first power operated means retracts said injection head away from said column, to substantially eliminate flash in the article molded from said stock.

9. In an automatic molding machine, injection means engageable with a mold plate having a cavity therein and a sprue extending to said cavity, a nozzle mounted on said injection means for projecting into said sprue in said plate until the outer end of said nozzle reaches the point where said sprue merges with said cavity, means in said injection means for forcing moldable stock into said nozzle and said mold cavity, and means on said outer end of said nozzle for severing the stock in said cavity from the stock in said nozzle at the point where said sprue merges with said cavity, to substantially eliminate flash in the article molded from said stock.

10. In an automatic molding machine as in claim 9, said severing means comprising a wire extending transversely across the outer end of said nozzle.

11. In an automatic molding machine, means for intermittently feeding moldable stock to an injection location, said stock feeding means comprising a platform having a stock take-up portion and a stock discharge portion and adapted to support said moldable stock during passage thereof toward said injection location, said platform being mounted for reciprocal movement toward and away from said injection location on said machine, power operated means mounted on said platform and having a head arranged for reciprocal movement thereover, a first pair of jaws pivotally mounted on said head for movement therewith intermediate said take-up and discharge portions, a second pair of jaws pivotally mounted on said platform intermediate said first pair of jaws and said discharge portion, each of said pairs of jaws facing said discharge portion of said platform and being located on opposite sides of the path of movement of said stock over said platform, and resilient means biasing the jaws of each of said pairs toward one another so as to engage said stock when the latter is located therebetween, said first pair of jaws gripping said stock as said head advances toward said discharge portion to feed said stock toward said injection location while said second pair of jaws are spread apart by the moving stock, said second pair of jaws gripping said stock and retaining the same in position as said head retracts said first pair of jaws toward said take-up portion, whereby said first pair of jaws are spread apart by their movement relative to said stock.

12. In an automatic molding machine provided with means for engaging from above and holding down a plurality of separable multi-plate molds filled with molding stock and assembled in stack formation, means for disassembling said multi-plate molds comprising power operated means mounted above said stack and having a foot arranged for reciprocal movement toward and away from the uppermost mold plate in said stack, said foot being engageable with said uppermost mold plate, means responsive to engagement of said foot with said uppermost mold plate for disengaging said holding means from the same, pawl means pivotally mounted on said foot for opening and closing around said uppermost mold plate, and resilient means attached to said pawl means for closing the same.

13. In an automatic molding machine, means for receiving disassembled mold plates, said receiving means comprising spaced, parallel guide means mounted on said machine for slidably supporting said disassembled plates, a lever pivotally mounted on said guide means, cam means mounted on one end of said lever and operable by engagement with said plates to pivot said lever in one direction, resilient means connected to said one end of said lever for pivoting said lever in an opposite direction, and catch means mounted on the other end of said lever for engaging said plates when said lever is pivoted in said opposite direction and for releasing said plates when said lever is pivoted in said one direction.

14. In an automatic molding machine, means for transporting disassembled mold plates from one part of said machine to another part thereof, said transporting means comprising a slide having oppositely disposed, angularly inclined legs extending from said machine and being joined together at their adjacent ends, each of said legs comprising spaced, parallel guides upon which said disassembled plates slide, and means on one of said legs at its juncture with the other of said legs for cushioning the impact of said plates against said one leg and for reversing their direction without upsetting said plates, so that said plates remain upright as they slide to said one leg from said other leg.

15. In an automatic molding machine, means for heating and guiding a column of stacked molds filled with moldable stock, said heating means comprising an elongated, hollow enclosure formed of insulating material mounted on said machine and surrounding said column substantially throughout the length thereof, and a plurality of spaced, elongated electrical heating elements arranged within and substantially coextensive with said enclosure for progressively and completely curing said stock, said guiding means comprising a plurality of spaced, elongated rods secured within and substantially coextensive with said enclosure for slidably engaging respective edges of said molds to maintain the same in stacked alignment in said column.

16. In an automatic molding machine, the combination of means for injecting moldable stock into molds and means for feeding said stock thereto, said injection means comprising an assembly reciprocably mounted in said machine for engaging said molds, said assembly comprising an injection head having a nozzle, an injection cylinder secured to said head and having an opening for receiving said stock, and first power operated means having an injection plunger reciprocable in said cylinder, said stock feeding means comprising a platform attached to said assembly for reciprocation therewith and adapted to support a portion of said stock, second power operated means mounted on said platform and having a reciprocable head, a first pair of jaws pivotally mounted on said head for movement therewith, and a second pair of jaws pivotally mounted on said platform, and resilient means closing each of said pairs of jaws to grip said stock, said first pair of jaws gripping said stock portion as said head advances to feed said stock into said opening in said cylinder while said second pair of jaws are spread apart by the moving stock, said second pair of jaws gripping said stock to maintain the same stationary as said head retracts while said first pair of jaws are spread apart by their movement relative to said stock.

17. In an automatic molding machine, the combination of means for supporting a column of stacked multi-plate molds, means for assembling said plates in said column, and means for disassembling said plates from said column, said supporting means comprising longitudinally spaced pawl mechanisms pivotally mounted on said frame for releasably engaging each end of said column, said assembling means comprising first power operated means reciprocably mounted in said machine at one end of said column for moving said column in one direction to release one of said pawl mechanisms and to assemble said mold plates in said column, said disassembling means comprising second power operated means reciprocably mounted in said machine at the other end of said column for engaging said column to release the other of said pawl mechanisms and to disassemble said mold plates from said column.

18. In an automatic molding machine having a column of stacked multi-plate molds filled with moldable stock, the combination of means for disassembling said plates from said column, means for receiving said plates from said disassembling means, means for removing said plates from said disassembling means and re-positioning said plates on said receiving means, and means for ejecting molded articles from said plates on said receiving means, said disassembling means comprising first power operated means mounted on said machine at an end of said column and having a reciprocable foot for engaging said column, and pawls pivotally mounted on said foot for gripping and separating said plates from said column, said receiving means comprising means on said machine for guiding said plates received from said pawls, and means pivotally mounted on said guiding means for releasably positioning said plates adjacent said ejecting means, said re-positioning means comprising second power operated means reciprocably mounted on said machine for removing said plates from said pawls and for re-positioning said plates on said guide means, said ejecting means comprising third power operated means reciprocably mounted on said machine for ejecting molded articles from said plates on said guiding means.

19. An automatic molding machine comprising a frame, means on said frame for releasably engaging and supporting a movable column of stacked molds filled with moldable stock, each of said molds comprising at least one cavity plate and at least one plug plate, means on said frame adjacent one end of said column for providing a landing for the mold plates, when unassembled, power operated means reciprocable on said frame adjacent said landing means for assembling said plates in said column, for moving said column in one direction, and for injecting said stock into a cavity plate, power operated means adjacent said reciprocable means for feeding said stock thereto, power operated means on said frame adjacent the other end of said column for moving said column in an opposite direction and for disassembling said mold plates from said column, means adjacent said disassembling means for receiving the disassembled mold plates therefrom, power operated means adjacent said disassembling means for removing said disassembled plates therefrom and for re-positioning the same on said receiving means, power operated means adjacent said receiving means for ejecting molded articles from said cavity plates, means extending from said receiving means to said landing means for transporting said disassembled plates away from said receiving means, power operated means on said transporting means adjacent said landing means for feeding said disassembled plates thereto, and electrical control means interconnecting each of the aforesaid power operated means with said supporting, landing, receiving and transporting means to actuate said power operated means in proper sequence and timed relation for continuous and automatic operation of said machine.

20. An automatic molding machine as in claim 19 wherein said means for supporting said column of stacked molds comprise a pair of spaced pawl mechanisms, each comprising an oppositely disposed pair of toggle levers having U-shaped legs pivotally mounted on said frame, an oppositely disposed pair of U-shaped arms pivotally mounted within said legs but outwardly of the pivotal mounting thereof, and spaced pawls extending from said arms for engagement with an end of said column, and resilient means interconnecting the toggle levers in one of said pawl mechanisms with the toggle levers in the other of said pawl mechanisms for maintaining said toggle levers in proper spaced relationship.

21. An automatic molding machine as in claim 20 wherein each of said oppositely disposed, U-shaped arms in one of said pawl mechanisms has a rod extending therefrom towards the other of said arms, resilient means connected to said rods for closing said pawls into engagement with said other end of said column, solenoid-operated means connected to said rods for opening and disengaging said pawls from said other end of said column, electrical means on said frame operable by said disassembling means as it reciprocates to activate and deactivate said solenoid-operated means for opening and closing said pawls, electrical means on said frame operable by said disassembling means to indicate that the latter has engaged and moved said column in said opposite direction, and electrical means on said frame operable by said toggle levers of said one pawl mechanism to indicate that said column has reached the limit of its movement under the influence of said reciprocable means or said disassembling means, respectively.

22. An automatic molding machine as in claim 19 wherein said landing means comprises a pair of inverted, U-shaped supports, the open ends of which are pivotally mounted within said frame and the closed ends of which slidably engage the disassembled mold plates, and resilient means interconnecting said supports to position said supports in spaced, parallel relationship for engagement with said plates while permitting said supports to be spread apart when said reciprocable means assemblies said plates in said column, and electrical means on said frame adjacent the closed ends of said supports and operable by said plates to indicate when said plates are properly positioned on said supports.

23. An automatic molding machine as in claim 19 wherein said reciprocable means comprises an assembly slidably mounted on guide bars within said frame, and a first fluid operated motor mounted on said frame for reciprocating the assembly to engage and move said column in one direction and to assemble said mold plates therein, said assembly comprising an injection head having a nozzle, an injection cylinder secured to said injection head, and a second fluid operated motor having a plunger reciprocable within said cylinder for injecting said stock into a cavity plate assembled in said column.

24. An automatic molding machine as in claim 23 wherein said nozzle has a wire extending diametrically across the outer end thereof for severing said stock in said cavity plate at the desired point therein as said first fluid operated motor retracts said injection head away from said column to substantially eliminate flash in the article molded from said stock.

25. An automatic molding machine as in claim 23 including electrical means interconnected in series so that each must be operated before said first fluid operated motor can be actuated to move said assembly toward said column for assembling said plates therein, one of said electrical means in series being mounted on said transporting means adjacent said landing means and operable by said mold plates, another of said electrical means in series being mounted on said frame and operable by one of said supporting means when disengaged from said column, another of said electrical means in series being mounted on said frame and operable by said disassembling means when engaging said column, and still another of said electrical means in series being mounted on said frame and operable by said mold plates when positioned on said landing means, electrical means on said frame operable by said disassembling means as it retracts from said column to connect in series with electrical selector means on said receiving means, said selector means being operable by a plug plate to reverse said first fluid operated motor and retract said assembly from said column after another plug plate has been assembled therein, said selector means being operable by a cavity plate to actuate said second fluid operated motor for injecting said stock into another cavity plate which has been assembled in said column, electrical means on said assembly operable by said injection plunger during its injection stroke to actuate a timing mechanism on said frame which controls the duration of the injection operation and at the end of which said timing mechanism energizes electrical means on said frame to retract said plunger and to reverse said first fluid operated motor for retracting said assembly, and electrical means on said frame operable by said retracting assembly to actuate said re-positioning means.

26. An automatic molding machine as in claim 19 wherein said stock feeding means comprises a platform attached to said reciprocable means for movement therewith and adapted to support said stock, a fluid operated motor mounted on said platform and having a reciprocable head, a first pair of jaws pivotally mounted on said head for movement therewith, a second pair of jaws pivotally mounted on said platform, resilient means closing each of said pairs of jaws to grip said stock, said first pair of jaws gripping said stock as said head advances to feed said stock to said reciprocable means while said second pair of jaws are spread apart by the moving stock, said second pair of jaws gripping said stock to maintain the same stationary as said head retracts while said first pair of jaws are spread apart by their movement relative to the stationary stock, electrical means on said transporting means operable by a plug plate for actuating said fluid operated motor to feed said stock, and electrical means on said platform operable by said reciprocable head as it completes its feeding stroke to reverse said fluid operated motor and retract said head.

27. An automatic molding machine as in claim 19 wherein said disassembling means comprises a fluid operated motor mounted on said frame adjacent the other end of said column and having a reciprocable piston foot engageable with said column, pawls pivotally mounted on said foot for opening and closing around the mold plate at said other end of said column, resilient means attached to each of said pawls for closing the same, electrical means on said frame operable by said re-positioning means to actuate said fluid operated motor and move said piston foot towards said column, electrical means on said frame operable by one of said supporting means when engaging said column to reverse said fluid operated motor and retract said piston foot from said column, electrical means on said frame operable by means on said foot for disengaging said one supporting means from the column as said foot engages said column and for reengaging said one supporting means with the column after said column has been moved in said one direction by said reciprocable means so that said piston foot and said end plate are clear of said one supporting means, electrical means on said frame operable by means on said foot for indicating when said foot has firmly engaged said column and the pawls on said foot have closed around said end plate, and electrical means on said frame operable by means on said foot as it retracts from said column for connecting in series with electrical selector means on said receiving means.

28. An automatic molding machine as in claim 19 wherein said receiving means comprises spaced, parallel guide means on which said mold plates slide, said guide means being attached to said frame adjacent said disassembling means, a lever pivotally mounted on said guide means, cam means mounted on one end of said lever and operable by engagement with a mold plate to pivot said lever in one direction and release another mold plate to be positioned on said transporting means, resilient means connected to said one end of said lever for pivoting said lever in the opposite direction, and catch means mounted on the other end of said lever to position a mold plate correctly with respect to said ejecting means and to prevent a mold plate from being positioned on said transporting means except when said lever is pivoted in said one direction by engagement between a mold plate and said cam means.

29. An automatic molding machine as in claim 28 wherein an electrical selector means is mounted on said guide means, said selector means being operable by a plug plate for retracting said reciprocable means away from said column, said selector means being operable by a cavity plate to actuate said reciprocable means for injecting said stock into another cavity plate.

30. An automatic molding machine as in claim 19 wherein said re-positioning device comprises a fluid operated motor mounted on a platform attached to said frame adjacent said disassembling means, said motor having a reciprocable plunger engageable with a mold plate in said disassembling means, electrical means on said frame and operable by said reciprocable means as it retracts from said column for actuating said motor and advancing said plunger to remove said plate from said disassembling means and re-position said plate on said receiving means, electrical means on said transporting means operable by said plates for reversing said motor and retracting said plunger, and electrical means on said frame operable by means on said plunger as it retracts for actuating said disassembling means and for reversing said ejecting means.

31. An automatic molding machine as in claim 19 wherein said ejecting means comprises a fluid operated motor mounted on a support extending from said frame and adjacent to said receiving means, said motor having a reciprocable plunger engageable with a molded part in a cavity plate positioned adjacent thereto on said receiving means, electrical means on said transporting means operable by a plug plate for actuating said motor and advancing said plunger to eject a molded article from said cavity plate, and electrical means on said frame operable by said re-positioning means as it retracts, to reverse said motor and retract said plunger.

32. An automatic molding machine as in claim 19 wherein said transporting means comprises a slide having oppositely disposed, angularly inclined legs, one of said legs being secured to said receiving means at one end and extending to the other of said legs which is secured to said frame adjacent said landing means, each of said legs comprising spaced, parallel guides upon which said mold plates slide, and means on said other leg at its juncture with said one leg for cushioning the impact of said plates against said other leg and for reversing their direction without upsetting said plates, so that said plates remain upright as they slide from said receiving means on said one leg and towards said landing means on said other leg.

33. An automatic molding machine as in claim 32 including electrical means on said one leg operable by said plates to reverse said mold re-positioning means and to connect in series with electrical selector means mounted on said one leg adjacent thereto, said selector means being operable by a plug plate to actuate said ejecting means and said stock feeding means, said selector means being operable by a cavity plate to prevent actuation of said ejecting means and said stock feeding means, and electrical means on said other leg adjacent said landing means and operable by said plates for actuating said plate feeding means.

34. An automatic molding machine as in claim 19 wherein said plate feeding means comprises a fluid operated motor mounted on said transporting means and having a reciprocable plunger for engaging said plates, electrical means on said transporting means and operable by one of said plates for actuating said motor and advancing said plunger to position another of said plates correctly on said landing means, electrical means on said frame operable by one of said supporting means when engaging said column for reversing said motor and withdrawing said plunger, and electrical means on said frame operable by said plunger as it advances to indicate when said plunger has engaged said other plate and correctly positioned the same on said landing means.

35. An automatic molding machine as in claim 19 wherein said electrical control system comprises electrical means on said transporting means operable by a mold plate for actuating said plate feeding means, electrical means connected in series so that each must be operated before actuating said reciprocable means towards said column, one of said electrical means in series being mounted on said transporting means adjacent said landing means and operable by said plate feeding means, another of said electrical means in series being mounted on said frame and operable by one of said supporting means when disengaged from said column, another of said electrical means in series being mounted on said frame and operable by said disassembling means when engaging said column and still another of said electrical means in series being mounted on said frame and operable by said mold plates when positioned on said landing means, electrical means on said frame operable by said one supporting means when engaging said column for reversing said repositioning means and said plate feeding means, electrical means on said frame operable by said disassembling means as it retracts from said column to connect in series with electrical selector means on said receiving means, said selector means being operable by a plug plate to retract said reciprocable means from said column after assembling a plug plate therein, said selector means being operable by a cavity plate to actuate means within said reciprocable means for injecting said stock into a cavity plate after said reciprocable means has assembled the same in said column, electrical means on said reciprocable means operable by said injecting means during its injection stroke for actuating a timing mechanism on said frame which controls the duration of the injection operation and at the end of which said timing mechanism energizes electrical means on said frame to retract said injection means and said reciprocable means, electrical means on said frame operable by said retracting reciprocable means to actuate said plate re-positioning means, electrical means on said transporting means adjacent said receiving means and operable by a mold plate to reverse said plate re-positioning means and to connect in series with electrical selector means on said transporting means adjacent thereto, said selector means on said transporting means being operable by a plug plate for actuating said ejecting means and said stock feeding means, said selector means on said transporting means being operable by a cavity plate to prevent actuation of said ejecting means and said stock feeding means, electrical means operable by said stock feeding means as it completes its feeding operation for reversing the latter, electrical means on said frame operable by said re-positioning means as it retracts to actuate said disassembling means and to reverse said ejecting means, and electrical means on said frame operable by means on said disassembling means for disengaging said one supporting means from said column as said disassembling means engages said column and for engaging said one supporting means with said column after said column has been moved up by said reciprocable means so that said disassembling means and the mold plate engaged thereby are clear of said upper supporting means.

References Cited in the file of this patent

UNITED STATES PATENTS

| 1,604,234 | Mead | Oct. 26, 1926 |
| 1,677,200 | Oakley | July 17, 1928 |
| 1,706,874 | DeJourno | Mar. 26, 1929 |
| 1,737,890 | Noichl et al. | Dec. 3, 1929 |
| 2,027,165 | Grubman | Jan. 7, 1936 |
| 2,325,752 | Dodge | Aug. 3, 1943 |
| 2,467,740 | Haller | Apr. 19, 1949 |
| 2,490,625 | Hall | Dec. 6, 1949 |
| 2,680,883 | Ashbaugh | June 15, 1954 |
| 2,747,226 | Schnitzius et al. | May 29, 1956 |

FOREIGN PATENTS

| 423,826 | Germany | Jan. 14, 1926 |